(12) United States Patent
Seki et al.

(10) Patent No.: US 10,415,446 B2
(45) Date of Patent: Sep. 17, 2019

(54) EXHAUST PURIFYING FILTER

(71) Applicant: Honda Motor Co.,Ltd., Tokyo (JP)

(72) Inventors: Chiaki Seki, Saitama (JP); Takeshi Mori, Saitama (JP); Takayuki Watanabe, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 16/172,893

(22) Filed: Oct. 29, 2018

(65) Prior Publication Data
US 2019/0203621 A1 Jul. 4, 2019

(30) Foreign Application Priority Data
Dec. 28, 2017 (JP) .................. 2017-253752

(51) Int. Cl.
| | |
|---|---|
| *F01N 3/10* | (2006.01) |
| *F01N 3/28* | (2006.01) |
| *B01D 53/94* | (2006.01) |
| *B01D 46/24* | (2006.01) |
| *B01D 53/88* | (2006.01) |

(52) U.S. Cl.
CPC ........... *F01N 3/101* (2013.01); *B01D 46/247* (2013.01); *B01D 46/2474* (2013.01); *B01D 53/885* (2013.01); *B01D 53/9445* (2013.01); *F01N 3/2828* (2013.01); *B01D 2258/012* (2013.01); *F01N 2250/02* (2013.01)

(58) Field of Classification Search
CPC ..... F01N 3/101; F01N 3/2828; B01D 46/247; B01D 53/885; B01D 53/9445
USPC ........................................ 422/168, 177, 180
See application file for complete search history.

(56) References Cited

U.S. PATENT DOCUMENTS

| | | | | |
|---|---|---|---|---|
| 6,120,747 A | * | 9/2000 | Sugishima | ......... B01D 53/8659 423/240 S |
| 2008/0092499 A1 | * | 4/2008 | Otsuka | ................ C04B 38/0006 55/307 |

(Continued)

FOREIGN PATENT DOCUMENTS

| | | |
|---|---|---|
| JP | 2017082745 | 5/2017 |
| JP | 2017217646 | 12/2017 |

OTHER PUBLICATIONS

"Office Action of Japan Counterpart Application", dated Apr. 2, 2019, with English translation thereof, p. 1-p. 5.

*Primary Examiner* — Tom P Duong
(74) *Attorney, Agent, or Firm* — JCIPRNET

(57) ABSTRACT

Provided is an exhaust purifying filter having high catalyst purification performance and particulate matter capturing performance while reducing pressure loss. A GPF includes a filter substrate in which a plurality of cells extending from an inflow-side end surface to an outflow-side end surface are partitioned and formed by a porous partition wall and an inflow-side cell in which an opening in the outflow-side end surface is sealed and an outflow-side cell in which an opening in the inflow-side end surface is sealed are alternately disposed; and a TWC which is carried on the partition wall, wherein a difference between a total volume of pores having pore diameters within a range of 0.1 μm to 10.7 μm in pore distribution of the GPF and a total volume of pores having pore diameters within a range of 0.1 μm to 10.7 μm in pore distribution of the filter substrate is 0.015 ml/g~0.06 ml/g.

6 Claims, 19 Drawing Sheets

(56) References Cited

U.S. PATENT DOCUMENTS

| | | | |
|---|---|---|---|
| 2008/0264010 A1* | 10/2008 | Mizuno | B01D 46/2429 55/350.1 |
| 2009/0005240 A1* | 1/2009 | Noguchi | B01D 46/2429 502/251 |
| 2010/0242424 A1* | 9/2010 | Harada | B01D 53/9454 55/486 |
| 2011/0224069 A1* | 9/2011 | Goto | B01D 46/2429 502/100 |
| 2012/0186212 A1* | 7/2012 | Tanaka | B01D 46/2429 55/524 |
| 2014/0154145 A1* | 6/2014 | Aoki | B01J 35/0006 422/180 |

* cited by examiner

INITIAL STAGE

EXAMPLE 3

COMPARATIVE EXAMPLE 1

COMPARATIVE EXAMPLE 2

EXHAUST PURIFYING FILTER

CROSS-REFERENCE TO RELATED APPLICATION

This application claims the priority benefit of Japan Application No. 2017-253752, filed on Dec. 28, 2017. The entirety of each of the above-mentioned patent applications is hereby incorporated by reference herein and made a part of this specification.

BACKGROUND

Technical Field

The disclosure relates to an exhaust purifying filter having a three-way catalyst.

Description of Related Art

Conventionally, among gasoline engines mounted in automobiles, direct injection type gasoline engines have been adopted in view of improving combustion efficiency and the like. However, since such direct injection gasoline engines discharge more particulate matters such as PM than port injection (PI) type engines, a technology for installing an exhaust purifying filter (Gasoline Particulate Filter, hereinafter referred to as "GPF") which captures particulate matters in an exhaust passage of a gasoline engine has been under study in response to the recent enhancement of emission regulations (PM emission regulations and PN (number of exhaust particles) regulations).

Further, a three-way catalyst (hereinafter referred to as "TWC") for purifying CO, HC and NOx contained in an exhaust gas is carried on a honeycomb support and installed in the exhaust passage of the gasoline engine. Particularly since recent years, a plurality of TWCs have been disposed in series in the exhaust passage to satisfy performance required for catalyst purification. Therefore, it is not preferable in view of pressure loss or cost to newly install the GPF in addition to the plurality of TWCs in the exhaust passage.

Therefore, a technology in which the TWC is carried on the GPF and a three-way purification function is added to the GPF in addition to the ability to capture the particulate matters has been proposed (refer to, for example, Patent Document 1). In the technology of Patent Document 1, in a so-called wall flow type exhaust purifying filter, a porosity of internal pores in an inlet-side region corresponding to ½ of a thickness of a partition wall from a surface of the partition wall in contact with an inlet-side cell toward an outlet-side cell side is set to 25% or more in a thickness direction of the partition wall, and an average occupancy of a catalyst layer held in the internal pores is set to 75% or less. Accordingly, it is expected that additional improvement of the catalyst purification performance can be obtained.

PATENT DOCUMENTS

[Patent Document 1] Japanese Unexamined Patent Publication No. 2017-082745

However, even in the GPF of Patent Document 1, there is a problem that, when it is disposed in the exhaust passage, pressure loss is increased and an output is lowered, and high catalyst purification performance and particulate matter capturing performance are not obtained. Further, particulate matters such as ashes derived from oil are also captured in the exhaust purifying filter as a running distance increases, and in this case, the above-described problem becomes more apparent. In addition, since an amount of catalyst carried on the GPF is limited by the lowering of the output due to the increase in the pressure loss, the catalyst purification performance of the conventional TWC cannot be expected. That is, the pressure loss, the catalyst purification performance, and the particulate matter capturing performance are in a trade-off relation.

SUMMARY

The disclosure is to provide an exhaust purifying filter having high catalyst purification performance and particulate matter capturing performance while reducing pressure loss.

The disclosure provides an exhaust purifying filter (for example, a GPF 32 which will be described later) which is provided in an exhaust passage (for example, an exhaust pipe 3 which will be described later) of an internal combustion engine (for example, an engine 1 which will be described later) and captures and purifies particulate matters in an exhaust gas of the internal combustion engine, including a filter substrate (for example, a filter substrate 320 which will be described later) in which a plurality of cells extending from an inflow-side end surface (for example, an inflow-side end surface 32a which will be described later) of the exhaust gas to an outflow-side end surface (for example, an outflow-side end surface 32b which will be described later) are partitioned and formed by a porous partition wall (for example, a partition wall 323 which will be described later) and an inflow-side cell (for example, an inflow-side cell 321 which will be described later) in which an opening in the outflow-side end surface is sealed and an outflow-side cell (for example, an outflow-side cell 322 which will be described later) in which an opening in the inflow-side end surface is sealed are alternately disposed, and a three-way catalyst (for example, a TWC 33 which will be described later) which is carried on the partition wall, wherein a difference between a total volume of pores having pore diameters within a range of 0.1 μm to 10.7 μm in pore distribution of the exhaust purifying filter and a total volume of pores having pore diameters within a range of 0.1 μm to 10.7 μm in pore distribution of the filter substrate is 0.015 ml/g to 0.06 ml/g.

DESCRIPTION OF THE EMBODIMENTS

Figure 1:
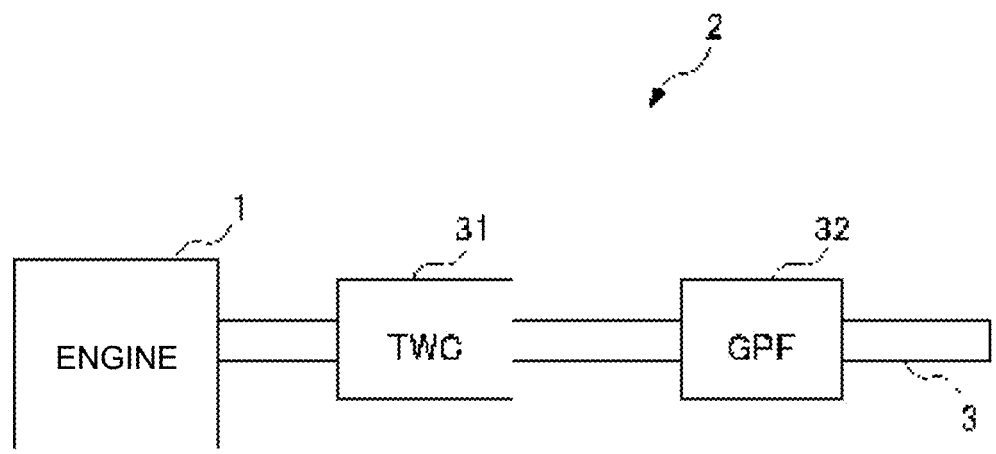
FIG. 1 is a diagram showing a configuration of an exhaust gas purifying device for an internal combustion engine according to an embodiment of the disclosure.

The disclosure provides an exhaust purifying filter (for example, a GPF 32 which will be described later) which is provided in an exhaust passage (for example, an exhaust pipe 3 which will be described later) of an internal combustion engine (for example, an engine 1 which will be described later) and captures and purifies particulate matters in an exhaust gas of the internal combustion engine, including a filter substrate (for example, a filter substrate 320 which will be described later) in which a plurality of cells extending from an inflow-side end surface (for example, an inflow-side end surface 32a which will be described later) of the exhaust gas to an outflow-side end surface (for example, an outflow-side end surface 32b which will be described later) are partitioned and formed by a porous partition wall (for example, a partition wall 323 which will be described later) and an inflow-side cell (for example, an inflow-side cell 321 which will be described later) in which an opening in the outflow-side end surface is sealed and an outflow-side cell (for example, an outflow-side cell 322 which will be described later) in which an opening in the inflow-side end surface is sealed are alternately disposed, and a three-way catalyst (for example, a TWC 33 which will be described later) which is carried on the partition wall, wherein a difference between a total volume of pores having pore diameters within a range of 0.1 μm to 10.7 μm in pore distribution of the exhaust purifying filter and a total volume of pores having pore diameters within a range of 0.1 μm to 10.7 μm in pore distribution of the filter substrate is 0.015 ml/g to 0.06 ml/g.

In the disclosure, the difference between the total volume of the pores having the pore diameters within the range of 0.1 μm to 10.7 μm in the pore distribution of a so-called wall flow type exhaust purifying filter on which the three-way catalyst is carried and the total volume of the pores having the pore diameters within the range of 0.1 μm to 10.7 μm in the pore distribution of the filter substrate is 0.015 mug to 0.06 ml/g. That is, a total volume of the pores formed between particles of the three-way catalyst compared to the pores in the filter substrate and having the pore diameters within the range of 0.1 μm to 10.7 μm is 0.015 ml/g to 0.06 ml/g.

Accordingly, the three-way catalyst in which a sufficient number of pores having a size of 0.1 μm to 10.7 μm are formed between the particles is carried on a surface of the partition wall (filter substrate), an increase in pressure loss can be minimized within an allowable range. At the same time, since the size of the pores in the surface of the partition wall (filter substrate) is narrowed by carrying the three-way catalyst on the surface of the partition wall (filter substrate) and it is possible to minimize particulate matters such as ashes contained in the exhaust gas entering the pores inside the partition wall, the increase in the pressure loss at an initial stage due to the particulate matters can be minimized.

Here, it was found by the applicant that there is a correlation between the increase in the pressure loss at the initial stage due to the particulate matters and the increase in the pressure loss after deposition of the particulate matters. That is, when the increase in the pressure loss at the initial stage due to the particulate matters can be minimized, the increase in the pressure loss after the deposition of the particulate matters can be reduced. Therefore, according to the disclosure, it is possible to minimize the increase in the pressure loss at the initial stage due to the particulate matters and to reduce the pressure loss after the deposition of the particulate matters. Furthermore, since it is possible to reduce the pressure loss without limiting a carrying amount of the three-way catalyst, it is possible to provide an exhaust purifying filter which can reduce the pressure loss and has high catalyst purification performance and particulate matter capturing performance.

A content rate of the three-way catalyst in the partition wall may be higher on an inflow-side cell side than on an outflow-side cell side in a thickness direction of the partition wall.

In the disclosure, the content rate of the three-way catalyst in the partition wall is higher on the inflow-side cell side than on the outflow-side cell side in the thickness direction of the partition wall.

Therefore, it is possible to minimize the particulate matters entering the pores inside the partition wall while securing necessary catalyst purification performance as compared with the case in which the three-way catalyst is uniformly carried on the partition wall, and the increase in the pressure loss can be minimized.

Further, since the particulate matters such as ashes or PM is gradually deposited on an outflow-side end of the inflow-side cell in which the opening in the outflow-side end surface is sealed, the exhaust gas flows to the vicinity of the outflow-side end of the inflow-side cell, then flows through the partition wall and flows into the outflow-side cell. That is, the exhaust gas is more likely to come into contact with the three-way catalyst carried on the inflow-side cell side than with the three-way catalyst carried on the outflow side cell side. Therefore, according to the disclosure, since the content rate of the three-way catalyst in the partition wall is greater on the inflow-side cell side than on the outflow-side cell side in the thickness direction of the partition wall, contact opportunities between the exhaust gas and the three-way catalyst can be increased to improve contact performance therebetween, and purification can be efficiently performed.

The filter substrate may have a pore diameter of more than 5 μm, and the three-way catalyst may have a particle diameter D90 of 5 μm or less when cumulative distribution from a small particle diameter side in particle diameter distribution becomes 90%.

In the disclosure, the pore diameter of the filter substrate is larger than 5 μm, while the particle diameter D90 of the three-way catalyst is 5 μm or less. In order to carry the three-way catalyst on the inner surfaces of the pores of the filter substrate, it is necessary to make the particle diameter of the three-way catalyst smaller than the pore diameter of the filter substrate. According to the disclosure, since the particle diameter D90 of the three-way catalyst is smaller than the pore diameter of the filter substrate to 5 μm or less, it is possible to more reliably carry the three-way catalyst on the inner surfaces of the pores of the filter substrate and to obtain the higher catalyst purification performance more reliably. At the same time, since the particle diameter D90 of the three-way catalyst is as small as 5 μm or less, the increase in the pressure loss can be further minimized.

The filter substrate may have a pore diameter of more than 5 μm, and the three-way catalyst may have a particle diameter D90 of 0.5 μm to 3 μm when the cumulative distribution from the small particle diameter side in the particle diameter distribution becomes 90%.

In the disclosure, the pore diameter of the filter substrate is larger than 5 μm, while the particle diameter D90 of the three-way catalyst is 0.5 μm to 3 μm. Generally, it is difficult to manufacture the particle diameter of the three-way catalyst to less than 0.5 μm. According to the disclosure, since the particle diameter D90 of the three-way catalyst is 0.5 μm or more, it is easy to manufacture. Further, since the particle diameter D90 of the three-way catalyst is smaller than 3 μm, it is possible to more reliably carry the three-way catalyst on the inner surfaces of the pores of the filter substrate and to obtain the higher catalyst purification performance more reliably.

According to the disclosure, it is possible to provide an exhaust purifying filter having high catalyst purification performance and particulate matter capturing performance while reducing pressure loss.

Hereinafter, an embodiment of the disclosure will be described with reference to the drawings.

FIG. 1 is a diagram showing a configuration of an exhaust gas purifying device 2 for an internal combustion engine (hereinafter referred to as an "engine") according to the embodiment.

The engine 1 is a direct injection type gasoline engine. As shown in FIG. 1, the exhaust gas purifying device 2 includes a TWC 31 and a GPF 32 which are disposed in this order from an upstream side of an exhaust pipe 3 through which an exhaust gas flows, and a GPF 32 as an exhaust gas purification filter.

The TWC 31 performs purification by oxidizing or reducing HC in the exhaust gas to $H_2O$ and $CO_2$, CO to $CO_2$, and NOx to $N_2$. For example, the TWC 31 may be one in which a noble metal such as Pd or Rh is carried as a catalyst metal on a carrier formed of an oxide such as alumina, silica, zirconia, titania, ceria, zeolite or the like. The TWC 31 is typically carried on a honeycomb support.

The TWC 31 includes an OSC material having an OSC function. In addition to $CeO_2$, a composite oxide of $CeO_2$ and $ZrO_2$ (hereinafter referred to as "CeZr composite oxide") can be used as the OSC material. Among them, the CeZr composite oxide is preferably used because it has high durability. The catalyst metal may be carried on these OSC materials.

There is no particular limitation on a manufacturing method of the TWC 31, and it is manufactured by a conventional method such as a slurry method or the like. For example, it is manufactured by preparing a slurry containing the above-described oxide, noble metal, OSC material and so on and then coating and baking the prepared slurry on a honeycomb support formed of a cordierite material.

The GPF 32 captures and purifies the particulate matters in the exhaust gas. Specifically, the particulate matters are captured by deposition of the particulate matters on a surface of a partition wall when the exhaust gas passes through fine pores in the partition wall which will be described later.

Here, the particulate matters in this specification include particulate matters such as exhaust gas (carbon soot), combustion residue of oil (SOF), ashes which are residues of combusted oil, and PM. In recent years, emission regulations for the particulate matters have become strict, and not only a total emission weight (g/km and g/kW) of the particulate matters (PM regulation) but also the number of particles of small particulate matters having particle diameters of 2.5 μm or less such as PM 25 (PN regulation) have been regulated. On the other hand, the GPF 32 according to the embodiment can cope with these PM regulations and PN regulations.

Figure 2:
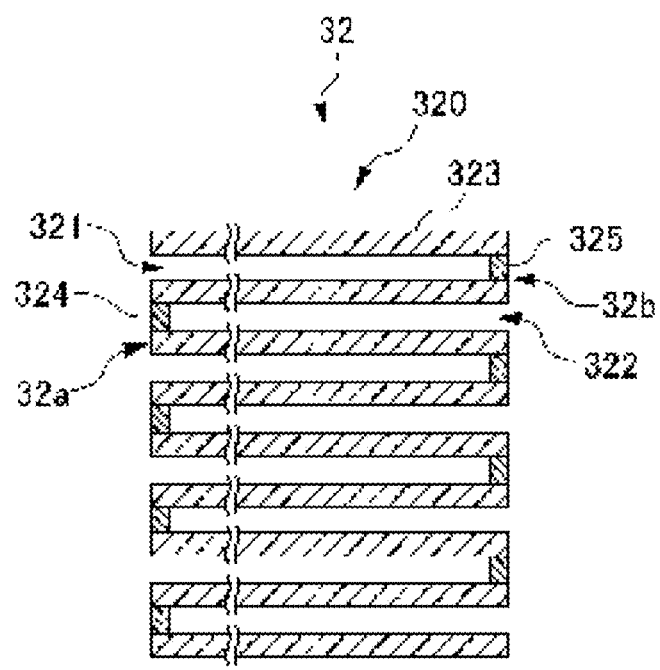
FIG. 2 is a schematic cross-sectional view of a GPF according to the embodiment.

FIG. 2 is a schematic cross-sectional view of the GPF 32 according to the embodiment.

As shown in FIG. 2, The GPF 32 includes a filter substrate 320. The filter substrate 320 has, for example, a cylindrical shape which is long in an axial direction and is formed of a porous body such as cordierite, mullite, or silicon carbide (SiC). A plurality of cells extending from an inflow-side end surface 32a to an outflow-side end surface 32b are provided in the filter substrate 320, and the cells are partitioned by a partition wall 323.

The filter substrate 320 has an inflow-side sealing portion 324 for sealing an opening in the inflow-side end surface 32a. A cell in which an opening in the inflow-side end surface 32a is sealed by the inflow-side sealing portion 324 constitutes an outflow-side cell 322 in which an inflow-side end is closed and an outflow-side end is open and through which the exhaust gas that has passed through the partition wall 323 flows out to a downstream side.

The inflow-side sealing portion 324 is formed by filling sealing cement from the inflow-side end surface 32a of the filter substrate 320.

The filter substrate 320 has an outflow-side sealing portion 325 for sealing an opening in the outflow-side end surface 32b. A cell in which an opening in the outflow-side end surface 32b is sealed by the outflow-side sealing portion 325 constitutes an inflow-side cell 321 in which an inflow-side end is open and an outflow-side end is closed and into which the exhaust gas flows from the exhaust pipe 3.

The outflow-side sealing portion 325 is formed by filling sealing cement from the outflow-side end surface 32b of the filter substrate 320.

The inflow-side cell 321 in which the opening in the outflow-side end surface 32b is sealed and the outflow-side cell 322 in which the opening in the inflow-side end surface 32a is sealed are alternately disposed by alternately sealing the opening in the inflow-side end surface 32a of the cell and the opening in the outflow-side end surface 32b. More specifically, the inflow-side cell 321 and the outflow-side cell 322 are disposed adjacent to each other in a lattice pattern (checkered pattern).

Figure 3:
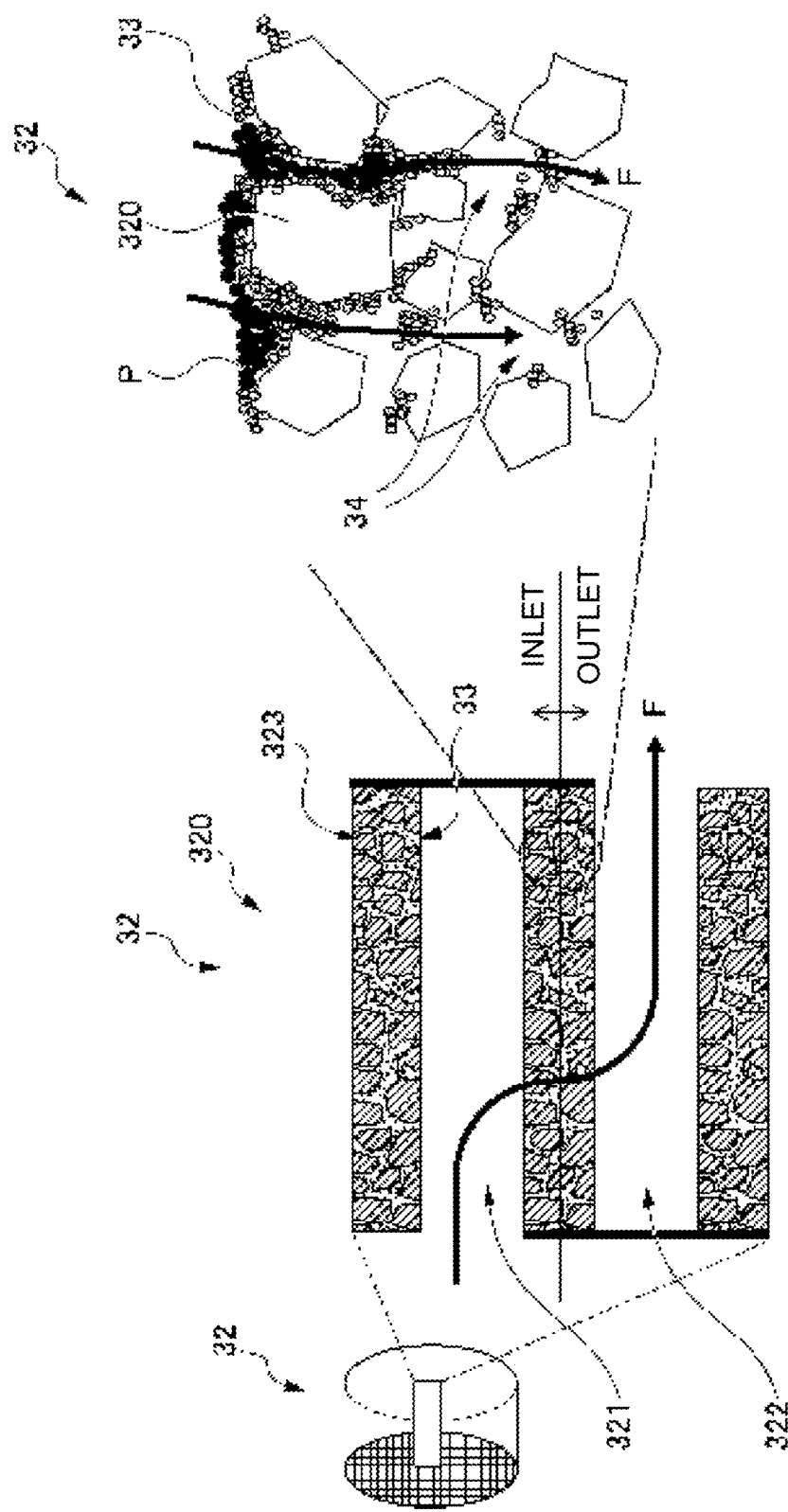
FIG. 3 is an enlarged cross-sectional view of the GPF according to the embodiment.

FIG. 3 is an enlarged cross-sectional view of the GPF 32 according to the embodiment.

As shown in FIG. 3, the TWC 33 is carried on a surface of the partition wall 323. Since the TWC 33 is carried in an atomized state, it is also carried in the pores on the surface side of the filter substrate 320 forming the partition wall 323 as shown in FIG. 3. The particulate matters P such as ashes is deposited on the surface of the partition wall 323, but the pores of the filter substrate 320 are not blocked by the particulate matters P. In addition, the pores are formed between particles in the TWC 33 as will be described later, and the pores of the filter substrate 320 are not blocked by the TWC 33. That is, as shown in FIG. 3, pores 34 remain in the partition wall 323 to ensure a flow F of the exhaust gas, such that large pressure loss does not occur.

Figure 4:
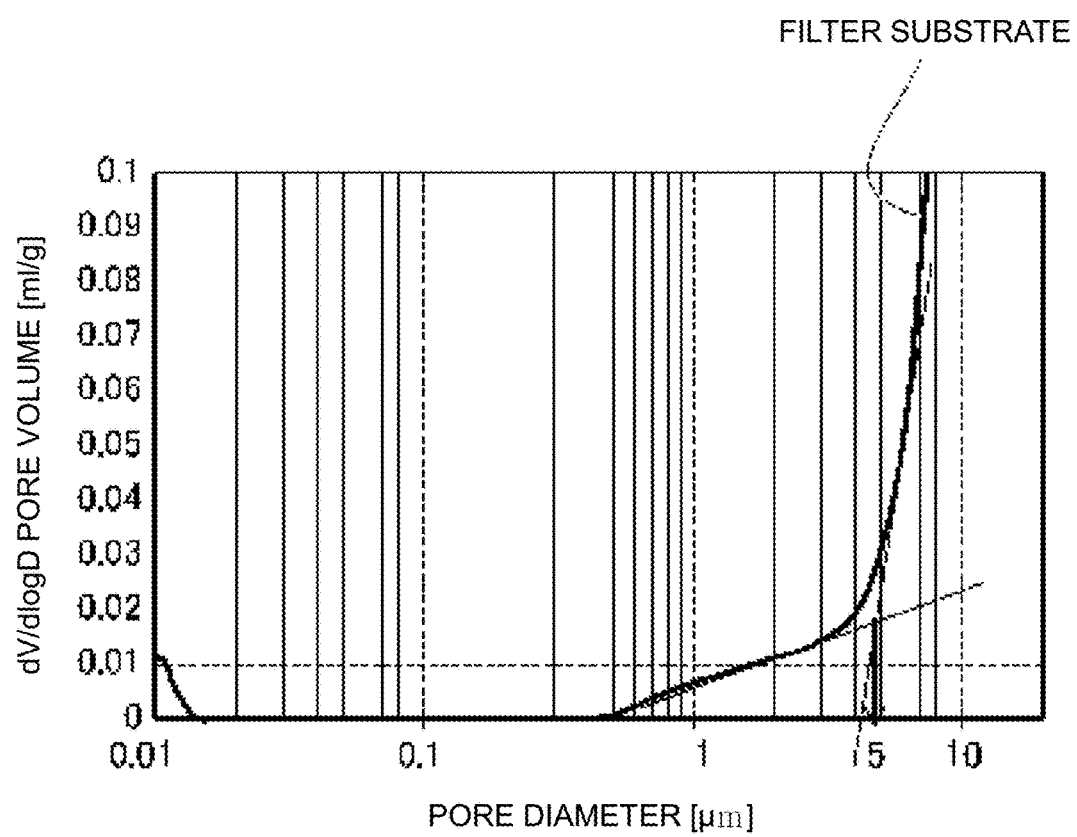
FIG. 4 is a diagram showing a preferable example of a pore distribution of a filter substrate according to the embodiment.

FIG. 4 is a diagram showing a preferable example of pore distribution in the filter substrate 320 according to the embodiment. This pore distribution is measured by an Hg porosimeter. In FIG. 4, a horizontal axis represents a pore diameter (μm), and a vertical axis represents Log differential pore volume distribution dV/d(log D) (ml/g).

As shown in FIG. 4, it can be understood that a peak of the pore diameter of the filter substrate 320 rises from 5 μm. This means that the pore diameter of the pores of the filter substrate 320 is larger than 5 μm. As described above, in the embodiment, it is preferable that the filter substrate 320 forming the partition wall 323 have a pore diameter larger than 5 μm. When the pore diameter is larger than 5 μm, the TWC 33 can enter the pores of the filter substrate 320 in relation to the particle diameter of the TWC 33 which will be described later, and thus the TWC 33 can be carried on inner surfaces of the pores on the surface side of the partition wall 323.

The porosity of the filter substrate 320 is preferably 55% to 68%. When the porosity of the filter substrate 320 is within this range, rapid deterioration of the pressure loss can be minimized when the TWC 33 is carried. A median diameter in the pore distribution measured by the Hg porosimeter is correlated with PN capturing performance. For example, in the embodiment, since the PN capturing performance is 85% and the median diameter of the Hg porosimeter is as small as 19 μm, the PN capturing performance is also excellent.

In contrast, it is preferable that the TWC 33 be atomized, and it is preferable that the particle diameter D90 when cumulative distribution from a small particle diameter side in a particle diameter distribution becomes 90% be 5 μm or less. When the particle diameter D90 of the TWC 33 is 5 μm or less, the TWC 33 can enter the pores in relation to the pore diameter of the filter substrate 320 forming the above-described partition wall 323, and the TWC 33 can be carried on the inner surfaces of the pores. Therefore, since more reliable and higher catalyst purification performance can be obtained and the D90 of the TWC 33 is as small as 5 μm or less, an increase in the pressure loss can be further minimized.

A more preferable D90 of the TWC 33 is 0.5 μm to 3 μm. Generally, it is difficult to manufacture a particle diameter of a three-way catalyst to be less than 0.5 μm. However, when the particle diameter D90 of the three-way catalyst is 0.5 μm or more, it is easy to manufacture. In addition, when the particle diameter D90 of the three-way catalyst is even smaller at 3 μm or less, the three-way catalyst can be more reliably carried on the inner surfaces of the pores of the filter substrate, and the higher catalyst purification performance can be obtained, and at the same time, the increase in the pressure loss can be further minimized.

Figure 5:
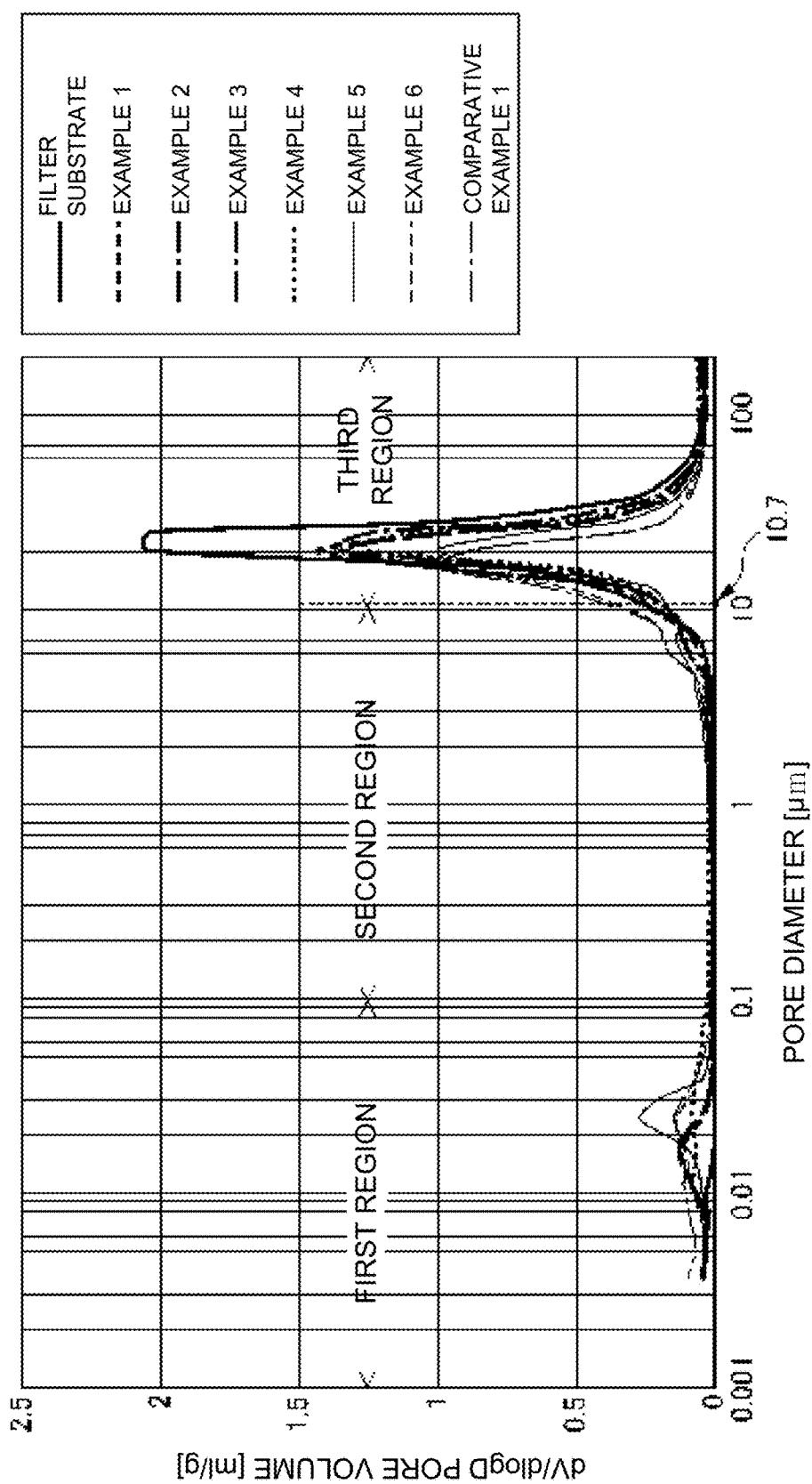
FIG. 5 is a diagram showing the pore distribution of the GPF according to Examples 1 to 6 and Comparative example 1.

Here, FIG. 5 is a diagram showing the pore distribution of the GPF according to Examples 1 to 6 and Comparative example 1 which will be described later. This pore distribution is measured by the Hg porosimeter. In FIG. 5, a horizontal axis represents the pore diameter (μm), and a vertical axis represents the Log differential pore volume distribution dV/d(log D) (ml/g). In FIG. 5, Examples 1 to 6 and Comparative example 1 correspond to Examples 1 to 6 and Comparative example 1 which will be described later, respectively, and the filter substrate is prepared in the same manner as in Examples 1 to 6 and Comparative example 1 which will be described later, respectively.

As shown in FIG. 5, the pore distribution of the GPF is roughly divided into three regions including a first region having a pore diameter smaller than 0.1 μm, a second region having a pore diameter of 0.1 μm to 10.7 μm and a third region having a pore diameter larger than 10.7 μm.

Figure 6:
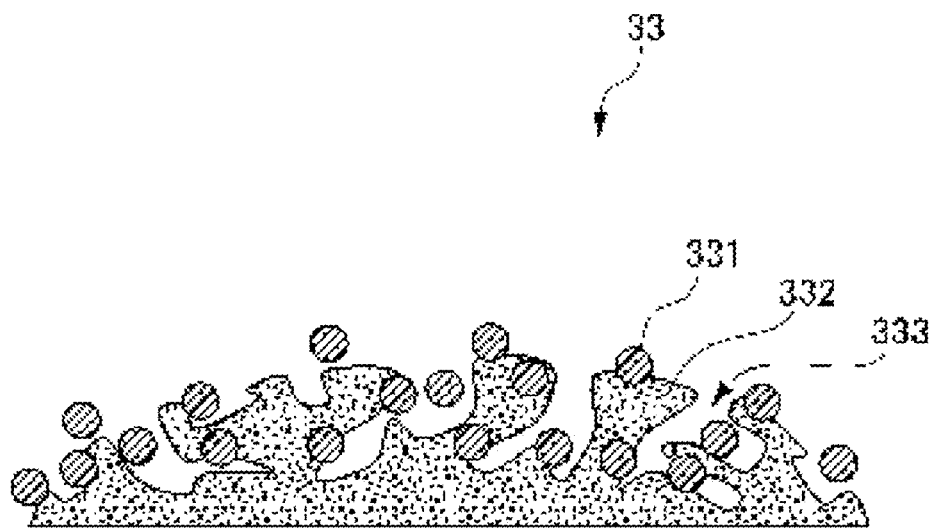
FIG. 6 is a diagram schematically showing pores in a particle surface of a TWC according to the embodiment.

The pores in the first region in which the pore diameter is smaller than 0.1 μm represent pores in the particle surface of the TWC 33. Here, FIG. 6 is a diagram schematically showing pores 333 in the particle surface of the TWC 33 according to the embodiment. As shown in FIG. 6, the pores 333 formed in a porous carrier 332 on which the above-described catalyst metal 331 is carried are present on the particle surface of the TWC 33. The pore diameter of the pores 333 present in the particle surface of the TWC 33 is less than 0.1 μm and constitutes the pores in the first region.

Figure 7:
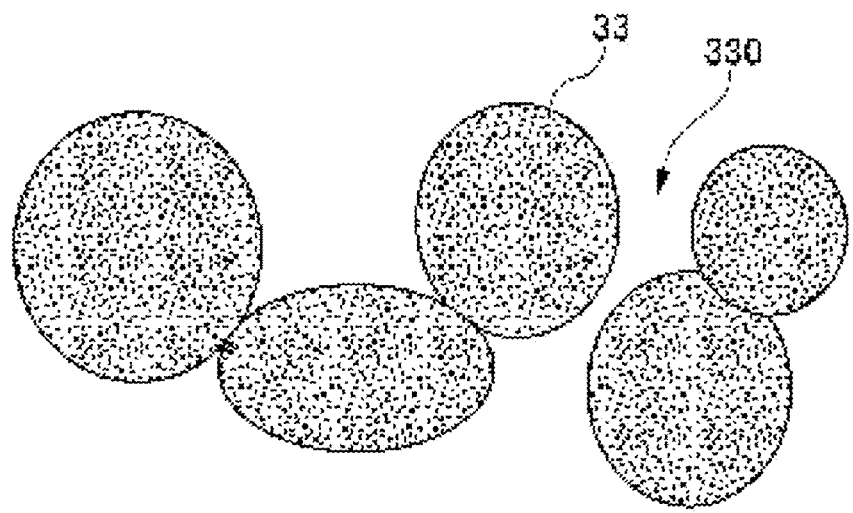
FIG. 7 is a diagram schematically showing pores formed between particles of the TWC according to the embodiment.

The pores in the second region having the pore diameter of 0.1 μm to 10.7 μm represent the pores formed between the particles of the TWC 33 and some (small pores) of the pores of the filter substrate 320 forming the partition wall 323. Here, FIG. 7 is a diagram schematically showing the pores 330 formed between the particles of the TWC 33 according to the embodiment. As shown in FIG. 7, the pores 330 are formed between the particles of the TWC 33, and the pore diameter of the pores 330 is within the range of 0.1 μm to 10.7 μm. That is, the pores 330 formed between the particles of the TWC 33 and some (small pores) of the pores of the filter substrate 320 forming the partition wall 323 constitute the pores in the second region.

Figure 8:
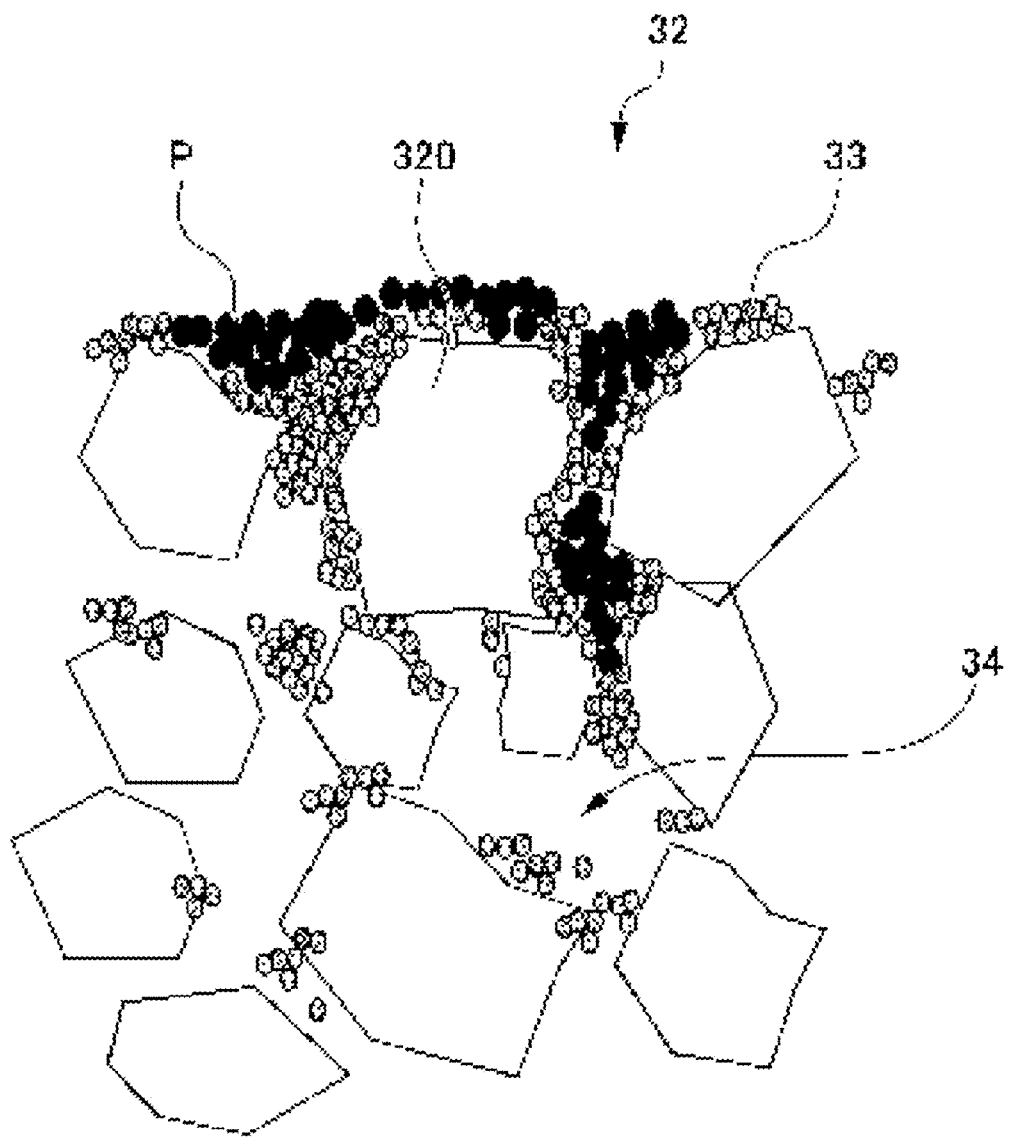
FIG. 8 is an enlarged cross-sectional view of a partition wall of the GPF according to the embodiment.

The pores in the third region having the pore diameter larger than 10.7 μm represent the pores of the filter substrate 320 forming the partition wall 323. Here, FIG. 8 is an enlarged cross-sectional view of the partition wall 323 of the GPF 32 according to the embodiment. As shown in FIG. 8, the pores 34 are present in the partition wall 323, and the pore diameter of the pores 34 is larger than 10.7 μm. That is, the pores 34 formed in the filter substrate 320 forming the partition wall 323 constitute the pores in the third region.

Based on the above, the embodiment is characterized in that a difference between a total volume of the pores in the pore diameter range of 0.1 μm to 10.7 μm (that is, the second region) in the pore distribution of the GPF 32 as shown in FIG. 5 and a total volume of the pores in the pore diameter range of 0.1 μm to 10.7 μm (that is, the second region) in the pore distribution of the filter substrate 320 is 0.015 mug to 0.06 ml/g. That is, as the pores 330 formed between the particles of the TWC 33 excluding the pores 34 in the filter substrate 320, the total volume of the pores of which the pore diameter is within the range of 0.1 μm to 10.7 μm is 0.015 mug to 0.06 ml/g.

Accordingly, since the TWC 33 in which a sufficient number of pores having a size of 0.1 μm to 10.7 μm is formed between the catalyst particles is carried on the surface of the partition wall 323 (the filter substrate 320), the increase in the pressure loss can be minimized within an allowable range. At the same time, as the TWC 33 is carried on the surface of the partition wall 323 (the filter substrate 320), the size of the pores in the surface of the partition wall 323 (the filter substrate 320) is narrowed, the particulate matters P such as ashes contained in the exhaust gas can be prevented from entering the pores in the partition wall 323, and thus the increase in the pressure loss at an initial stage due to the deposition of the particulate matters P can be minimized.

Here, a relationship between the deposition amount of the particulate matters P and the pressure loss will be described in detail with reference to FIGS. 9 to 12.

Figure 9:
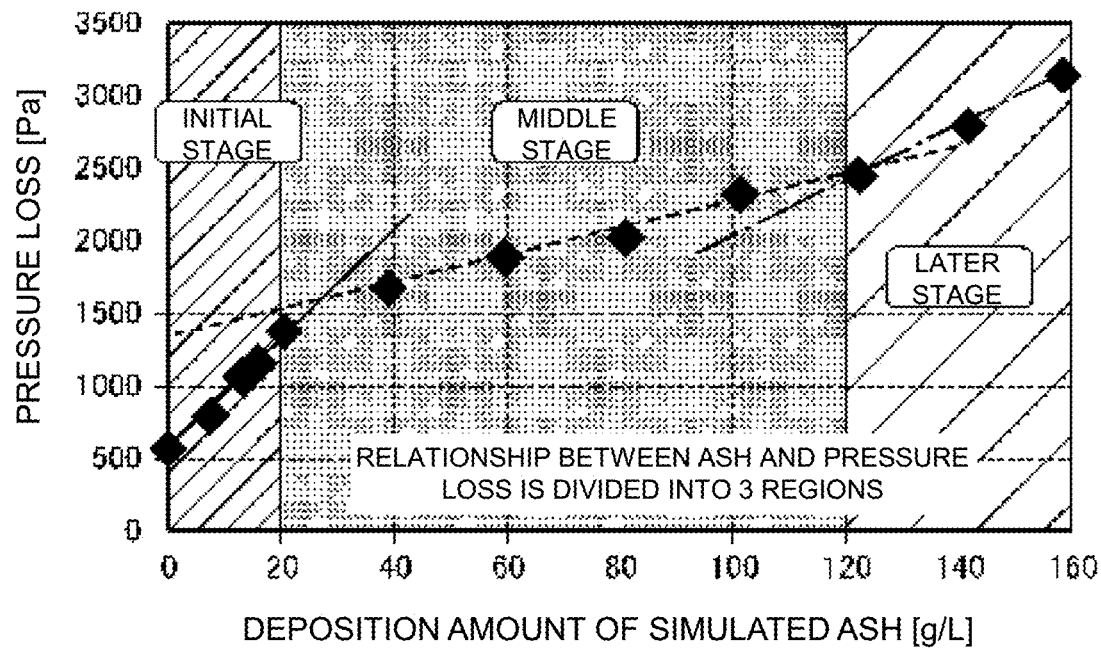
FIG. 9 is a diagram showing a relationship between a deposition amount of particulate matters and pressure loss.
Figure 10:
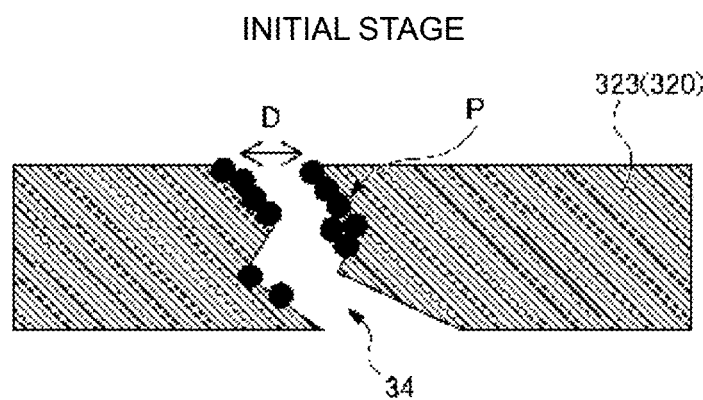
FIG. 10 is a cross-sectional view of the GPF at an initial stage of deposition of particulate matters.
Figure 11:
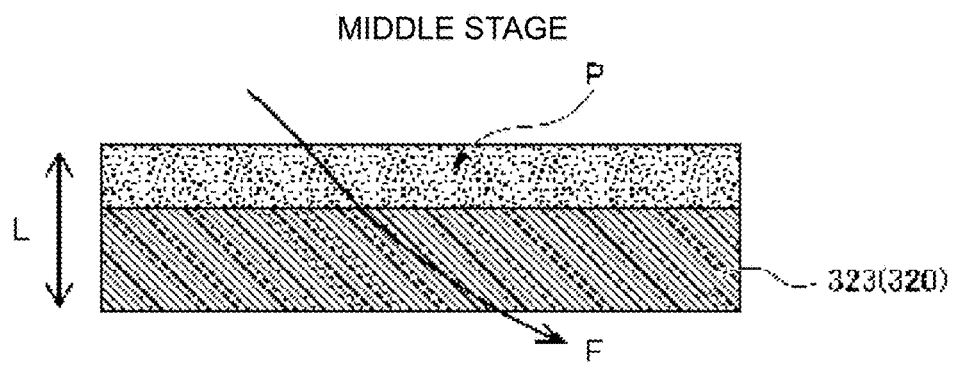
FIG. 11 is a cross-sectional view of the GPF at a middle stage of the deposition of the particulate matters.
Figure 12:
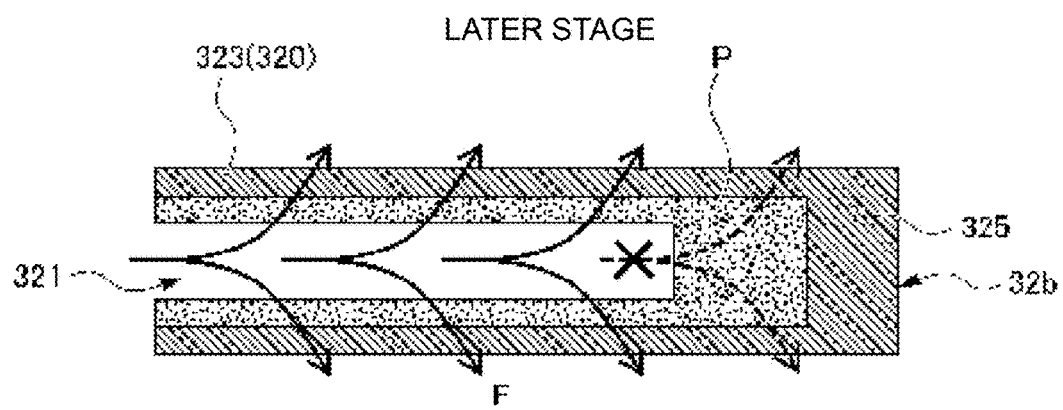
FIG. 12 is a cross-sectional view of the GPF at a later stage of the deposition of the particulate matters.

FIG. 9 is a diagram showing the relationship between the deposition amount of the particulate matters P and the pressure loss. FIG. 10 is a cross-sectional view of the GPF 32 at an initial stage of the deposition of the particulate matters P. FIG. 11 is a cross-sectional view of the GPF 32 at a middle stage of the deposition of the particulate matters P. FIG. 12 is a cross-sectional view of the GPF 32 at a later stage of the deposition of the particulate matters P.

As shown in FIG. 9, the relationship between the deposition amount of the particulate matters P and the pressure loss can be classified into three stages including the initial stage, the middle stage, and the later stage. The relationship diagram of FIG. 9 shows the pressure loss when the deposition amount of the particulate matters P is simulated as a deposition amount when ashes is deposited. In FIG. 9, a horizontal axis represents the deposition amount (g/L) of the simulated ash, and a vertical axis represents the pressure loss (Pa).

A behavior of the pressure loss in each stage in FIG. 9 can be explained on the basis of a pressure loss calculation equation (Fanning equation) represented by the following Equation (1).

$$\Delta P = \lambda \times (L/D) \times (rV^2/2) \qquad \text{Equation (1)}$$

In Equation (1), $\Delta P$ is the pressure loss, $\lambda$ is a friction coefficient, L is a thickness of the partition wall including the ash, D is an exhaust gas passage pore diameter which will be described later, r is exhaust density, and V is a flow velocity of the exhaust gas.

As shown in FIG. 10, at the initial stage of the deposition of the particulate matters P, the particulate matters P such as ashes enters the pores 34 on the surface side of the partition wall 323 (filter substrate 320) and is deposited. Therefore, the exhaust gas passage pore diameter D of the pores 34 through which the exhaust gas passes is reduced, and the rapid increase in the pressure loss shown in FIG. 9 occurs as is apparent from the above Equation (1). This phenomenon is greatly affected by the TWC 33, and in the embodiment, this can be minimized by controlling the particle diameter of TWC 33, the pore diameter between the particles, or the pore volume.

Figure 13:
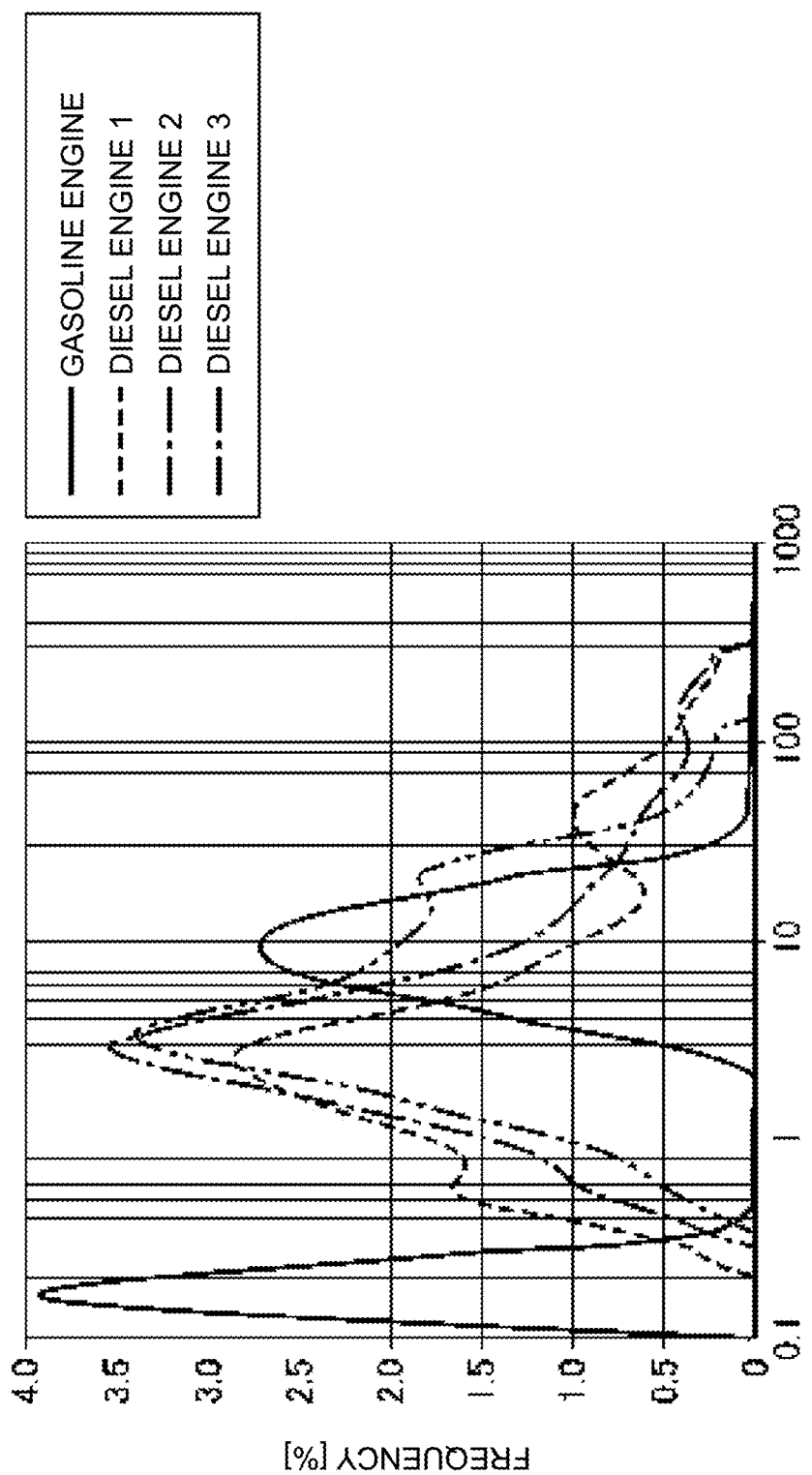
FIG. 13 is a diagram showing a particle diameter distribution of the particulate matters discharged from a gasoline engine and a particle diameter distribution of the particulate matters discharged from a diesel engine.

FIG. 13 is a diagram showing the particle diameter distribution of the particulate matters discharged from a gasoline engine and the particle diameter distribution of the particulate matters discharged from a diesel engine. In FIG. 13, a horizontal axis represents the particle diameter of the particulate matters, and a vertical axis represents frequency.

It can be understood from FIG. 13 that the particulate matters discharged from the gasoline engine have many small particulate matters having particle diameters of about 0.2 μm as compared with the particulate matters discharged from the diesel engine. Since the particulate matters having the particle diameters of about 0.2 μm is smaller than the pore diameter of the pores of the filter substrate 320 forming the partition wall 323, the particulate matters may enter the pores 34 on the surface side of the partition wall 323 (the filter substrate 320) and may cause the increase in the pressure loss at the initial stage of the deposition of the particulate matters P. Therefore, it can be said that the increase in the pressure loss at the initial stage of the deposition of the particulate matters P is a phenomenon which occurs remarkably in the case of the gasoline engine.

Next, as shown in FIG. 11, at the middle stage of the deposition of the particulate matters P, a particulate matter layer is formed by the particulate matters P deposited on the surface of the filter substrate 320. Accordingly, a thickness L of the partition wall 323 including the ashes corresponding to a partition wall passage distance of the exhaust gas increases, and the pressure loss rises linearly as apparent from the above Equation (1). This phenomenon is less affected by the TWC 33.

As shown in FIG. 12, at the later stage of the deposition of the particulate matters P, the particulate matters P such as ashes are deposited in the vicinity of the outflow-side end surface 32b of the inflow-side cell 321. Therefore, the transmission of the exhaust gas is restricted in the vicinity of the outflow-side end surface 32b, and thus the flow velocity of the exhaust gas rises. The pressure loss rises quadratically as apparent from the above Equation (1). This phenomenon is less affected by the TWC 33.

Figure 14:
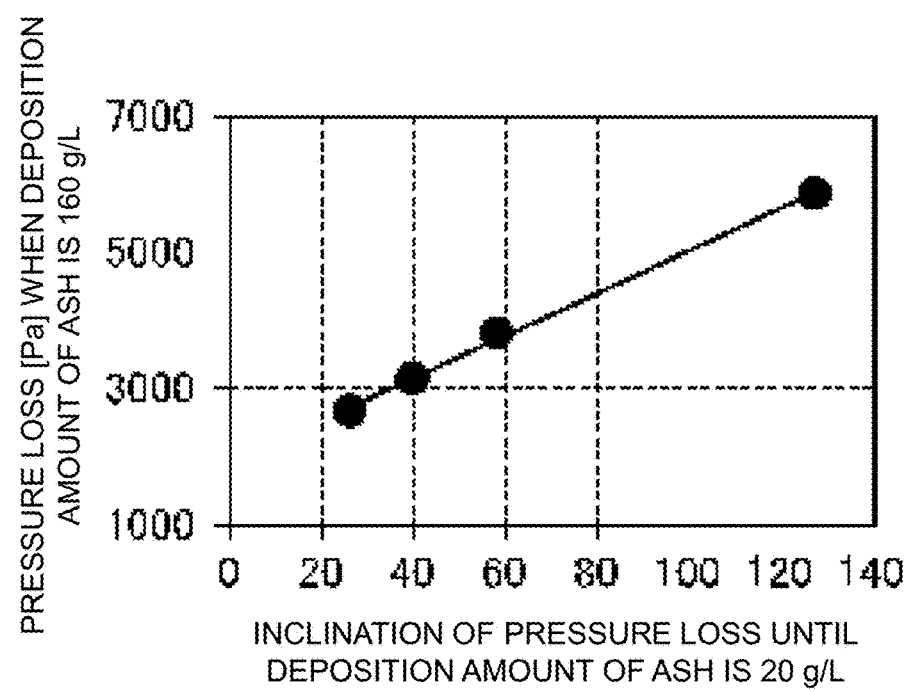
FIG. 14 is a diagram showing a relationship between an inclination of the pressure loss at an initial stage of ashes deposition and pressure loss at a later stage of the ashes deposition.

FIG. 14 is a diagram showing a relationship between an inclination of the pressure loss at the initial stage of the ashes deposition and the pressure loss at the later stage of the ashes deposition. In FIG. 14, a horizontal axis represents the inclination of the pressure loss up to an ashes deposition amount of 20 g/L, and a vertical axis represents the pressure loss when the ashes deposition amount is 160 g/L.

It can be understood from FIG. 14 that the inclination of the pressure loss at the initial stage of the deposition of the particulate matters P such as ashes and the pressure loss at the later stage of the deposition are correlated with each other. That is, it can be understood that the increase in the pressure loss at the later stage of the deposition, i.e., after endurance can be minimized by minimizing the increase in the pressure loss at the initial stage of the deposition of the particulate matters P. Therefore, as described above, according to the GPF 32 of the embodiment which minimizes the increase in the pressure loss at the initial stage of the deposition of the particulate matters P, it is possible to reliably minimize the increase in the pressure loss after the deposition of particulate matters.

Returning to FIG. 3, like the above-described TWC 31, the TWC 33 performs purification by oxidizing or reducing HC in the exhaust gas to $H_2O$ and $CO_2$, CO to $CO_2$, and NOx to $N_2$, respectively. For example, the TWC 33 may be one in which a noble metal such as Pd or Rh as a catalyst metal is carried on a carrier formed of an oxide such as alumina, silica, zirconia, titania, ceria, zeolite or the like.

Further, the TWC 33 includes an OSC material (oxygen-absorbing and releasing material). In addition to $CeO_2$, a composite oxide of $CeO_2$ and $ZrO_2$ (hereinafter, referred to as "CeZr composite oxide") can be used as the OSC material. Among them, the CeZr composite oxide is preferably used because it has high durability. The catalyst metal may be carried on these OSC materials. In order to simultaneously produce a catalytic action of the above-described TWC, it is preferable to keep a ratio of fuel and air (hereinafter, referred to as "air-fuel ratio") near the stoichiometric ratio (hereinafter, referred to as "stoichiometry") in a complete combustion reaction, and the higher catalyst purification performance can be obtained using the OSC material having the capability of absorbing and releasing oxygen, which absorbs oxygen in an oxidizing atmosphere and releases oxygen in a reducing atmosphere, as a promoter together with the catalyst metal.

There is no particular limitation on a manufacturing method of the TWC 33, and it is manufactured by a conventional method such as a slurry method or the like. For example, it is manufactured by milling and preparing a slurry containing the above-mentioned oxide, noble metal, OSC material and so on and then coating and baking the prepared slurry on the filter substrate 320. A catalyst particle diameter of the TWC can be adjusted by changing a milling time.

A wash coat amount of the TWC 33 having the above-described configuration is preferably 40 to 80 g/L. When the wash coat amount of the TWC 33 is within this range, the high catalyst purification performance and particulate matter capturing performance can be obtained while the increase in the pressure loss is reduced.

In the embodiment, the TWC 33 may include another noble metal, such as Pt, as the catalytic metal.

Further, in the GPF 32 according to the embodiment, it is preferable that a content rate of the TWC 33 in the partition wall 323 is larger on the inflow-side cell 321 side than on the outflow-side cell 322 side in a thickness direction of the partition wall 323. That is, it is preferable that a content of the TWC33 is larger on an inlet side of the partition wall 323 shown in FIG. 3 than on an outlet side of the partition wall 323.

Accordingly, the particulate matters can be minimized from entering the pores inside the partition wall 323 while the required catalyst purification performance is ensured, and thus the increase in the pressure loss can be minimized as compared with the case in which the TWC is uniformly carried on the partition wall 323.

Further, since the particulate matters P such as ashes or PM is gradually deposited on an outflow-side end of the inflow-side cell 321 in which the opening of the outflow-side end surface 32b is sealed, the exhaust gas flows to the vicinity of the outflow-side end of the inflow-side cell 321 and then flows into the outflow-side cell 322 through the partition wall 323. That is, the exhaust gas is more likely to come into contact with the TWC 33 carried on the inflow-side cell 321 side than with the TWC 33 carried on the outflow-side cell 322 side. This is especially evident in the initial stage of the deposition or, for example, when the internal combustion engine is a gasoline engine. Therefore, according to the GPF 32 of the embodiment, since the content rate of the TWC 33 in the partition wall 323 is larger on the inflow-side cell 321 side than on the outflow-side cell 322 side in the thickness direction of the partition wall 323, the contact opportunity between the exhaust gas and the TWC 33 can be increased to improve contact performance therebetween, and thus the purification can be efficiently performed.

The GPF 32 according to the embodiment having the above-described configuration is manufactured by, for example, a piston pushing up method. In the piston pushing method, a slurry containing a predetermined amount of a constituent material of the TWC 33 is prepared by milling, and the TWC 33 is carried on the filter substrate at a WC amount of 60 g/L by the piston pushing method using the inflow-side end surface of the filter substrate as an inflow inlet for the slurry. Then, the GPF32 is obtained by drying and baking.

The disclosure is not limited to the above-described embodiment, and variations and improvements within the scope of achieving the objective of the disclosure are included in the disclosure.

EXAMPLES

Next, Examples of the disclosure will be described. However, the disclosure is not limited to these Examples.

Examples 1 to 6 and Comparative Examples 1 and 2

First, an aqueous solution of Pd nitrate and an $Al_2O_3$ carrier (Alumina, product name "sCFa140/L3" manufactured by Sasol Limited) were injected into an evaporator so that Pd is impregnated and carried on the $Al_2O_3$ carrier. Next, after drying, baking was performed at 600° C. to obtain a $Pd/Al_2O_3$ catalyst. In the same manner, Pd nitrate and a $CeO_2.ZrO_2$-based composite oxide ($CeO_2.ZrO_2$-based composite oxide (Ce:Zr=4:6) manufactured by Daiichi Elementary Chemical Co., Ltd.) were manufactured to obtain a $Pd/CeO_2.ZrO_2$ catalyst. In all cases, an amount of Pd of the noble metal was 1.77% by mass. A size of the carrier used was Φ0118.4×91 mm, IL size.

Then, the $Pd/Al_2O_3$ catalyst and the $Pd/CeO_2.ZrO_2$ catalyst were equally mixed, and water and a binder were mixed and milled in a ball mill. The TWCs having different catalyst particle diameters were manufactured by varying the milling time in each of Examples and Comparative examples. Specifically, the catalyst particle diameters in each of Examples and Comparative examples were 0.5 μm (Example 1), 1.2 μm (Example 2), 2.8 μm (Example 3), 4.1 μm (Example 4), 4.5 μm (Example 5), 5.4 μm (Example 6), 8.3 μm (Comparative example 1), and 3.4 μm (Comparative example 2). The particle diameter D90 of the TWC was measured by the particle diameter distribution in a slurry state.

In Examples 1 to 6 and Comparative example 1, the inflow-side end surface of the filter substrate was used as an inflow inlet of the slurry, and the TWC was carried on the filter substrate at a WC amount of 60 g/L by the piston pushing method. Thereafter, the drying was performed at 150° C. while air was blown, and then the baking was performed at 600° C. to obtain each of the GPFs.

In Comparative example 2, the TWC was carried on the filter substrate at a WC amount of 60 g/L by the piston pushing method using the outflow-side end surface of the filter substrate as the inflow inlet for the slurry. Thereafter, the drying was performed at 150° C. while air was blown, and then the baking was performed at 600° C. to obtain the GPF.

[Inlet/Outlet Ratio]

An Inlet/Outlet ratio of the GPF according to each of Examples and Comparative examples was measured by performing element distribution mapping for a cross section of each of the GPFs by EPMA (FE-EPMA manufactured by JEOL Corporation, product name "XA-8500F"). More specifically, an EPMA image obtained by the measurement was ternarized using image analysis software "Image-Pro Plus 6.1" manufactured by Nippon Roper Media Cybernetics Division, and the filter substrate (carrier), the TWC and the pores were color-coded. Then, the Inlet/Outlet ratio was calculated by obtaining an occupancy ratio of the TWC with respect to the pores on the inlet side and the outlet side of the partition wall.

[Durability Test]

A durability test for the GPF according to each of Examples and Comparative examples was performed using gypsum as simulated ash. Specifically, first, after the gypsum is baked, milling was performed until the particle diameter became close to that of actual ash. Next, durability in actual running was simulated by suctioning a predetermined amount of simulated ashes on the filter substrate using a self-built suction device (in which a large dry pump (having a designed displacement of 1850 L/min) is connected to a tank and vacuum suction is performed).

[Pressure Loss]

The pressure loss of the GPF according to each of Examples and Comparative examples was measured using a catalyst carrier pressure loss tester manufactured by Tsukuba Rika Seiki Co., Ltd. Specifically, a full size (Φ118.4×91 mm) of the GPF was set, and air was blown at a flow rate of 2.17 m$^3$/min (COLD FLOW), and the pressure loss was measured.

[Investigation]

Figure 15:
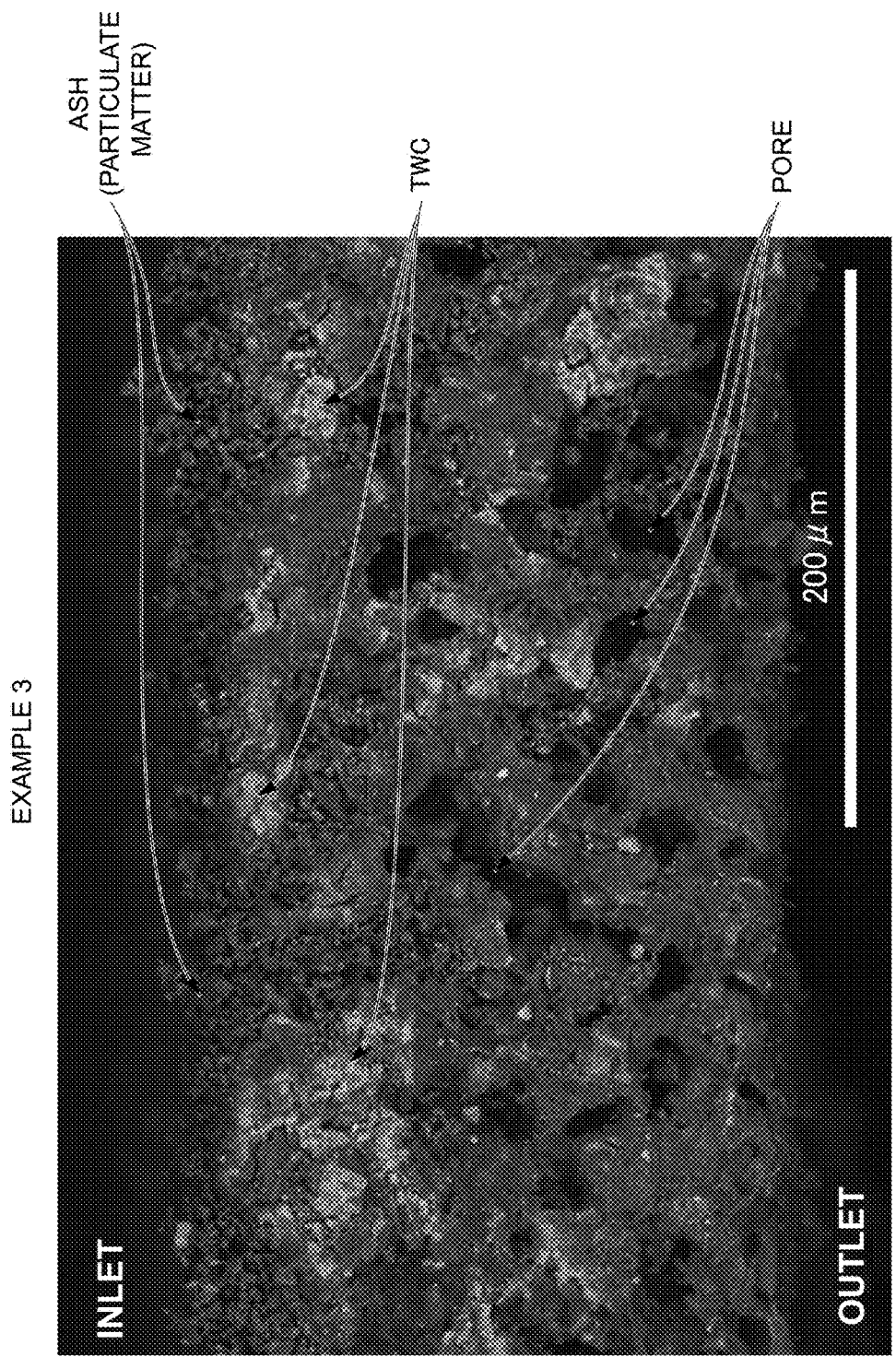
FIG. 15 is a cross-sectional SEM image of the GPF after a durability test (after the deposition of the particulate matters) according to Example 3.

For the GPF of Example 3 in which the particle diameter D90 of the TWC was 3 μm, the inlet/outlet ratio was calculated and it was 1.67. FIG. 15 is a cross-sectional SEM image of the GPF after the durability test (after the deposition of the particulate matters) according to Example 3. As shown in FIG. 15, when the inlet/outlet ratio≥1, it was confirmed that the pores on the inlet side were narrowed by the TWC and it was difficult for the particulate matters to enter the pores.

Figure 16:
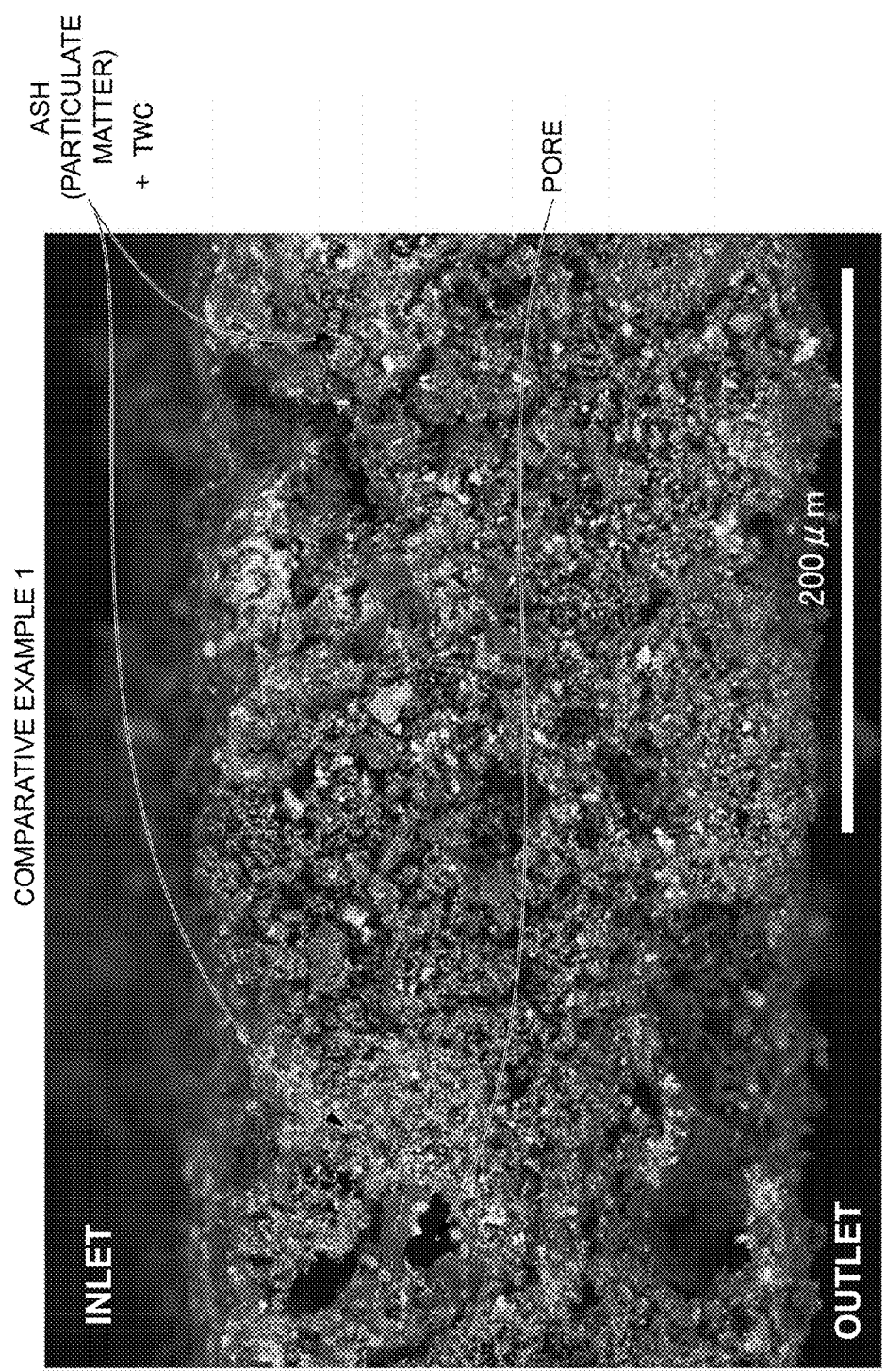
FIG. 16 is a cross-sectional SEM image of the GPF after the durability test (after the deposition of the particulate matters) according to Comparative example 1.

For the GPF of Comparative example 1 in which the particle diameter D90 of the TWC was 8 μm, the inlet/outlet ratio was calculated and it was 1.82. FIG. 16 is a cross-sectional SEM image of the GPF after the durability test (after the deposition of the particulate matters) according to Comparative example 1. As shown in FIG. 16, when the inlet/outlet ratio≥1 but the particle diameter D90 of the TWC is large, it was confirmed that particulate matters such as ashes passed through a space between the catalyst particles and easily entered.

Figure 17:
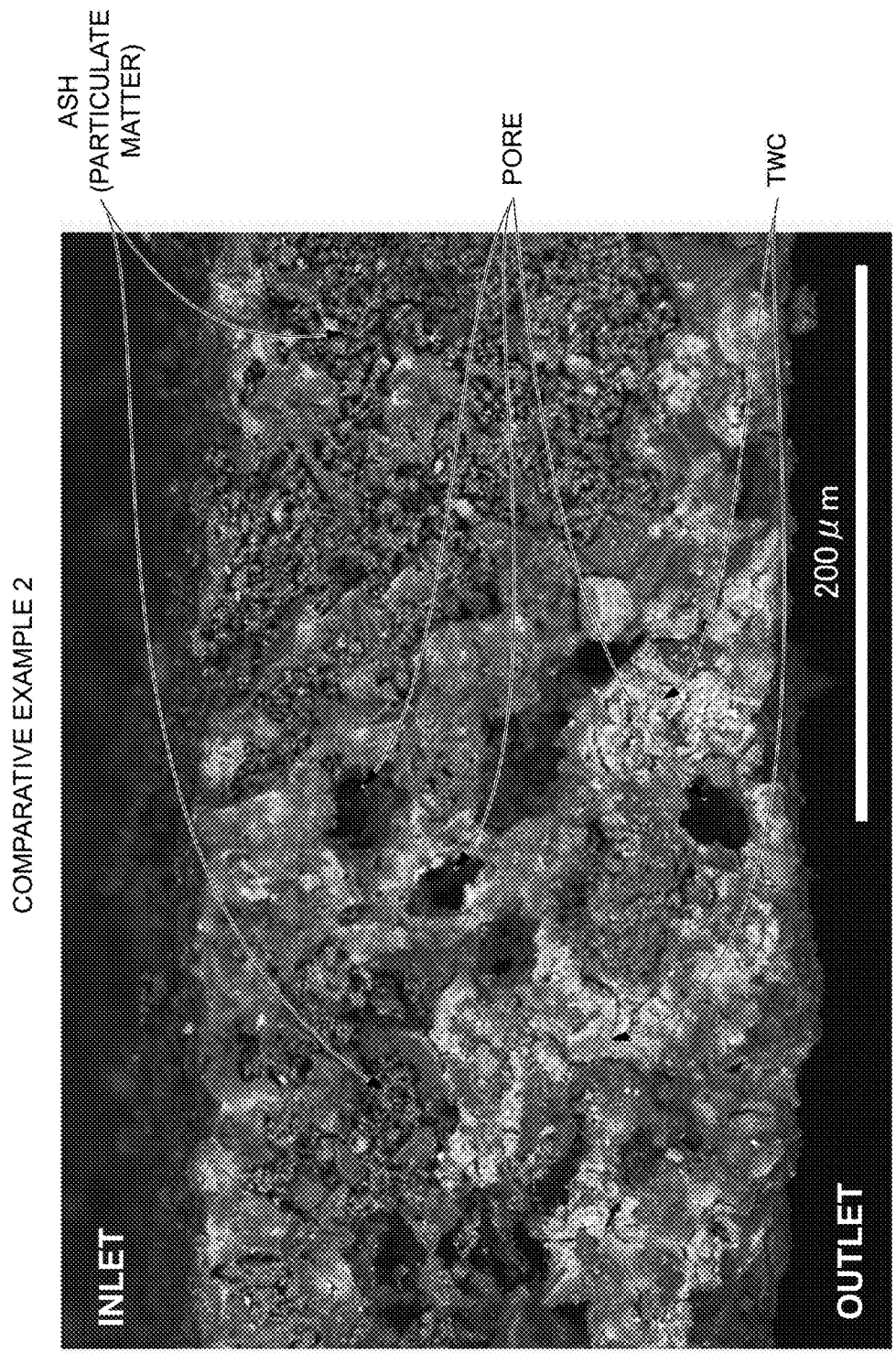
FIG. 17 is a cross-sectional SEM image of the GPF after the durability test (after the deposition of the particulate matters) according to Comparative example 2.
Figure 18:
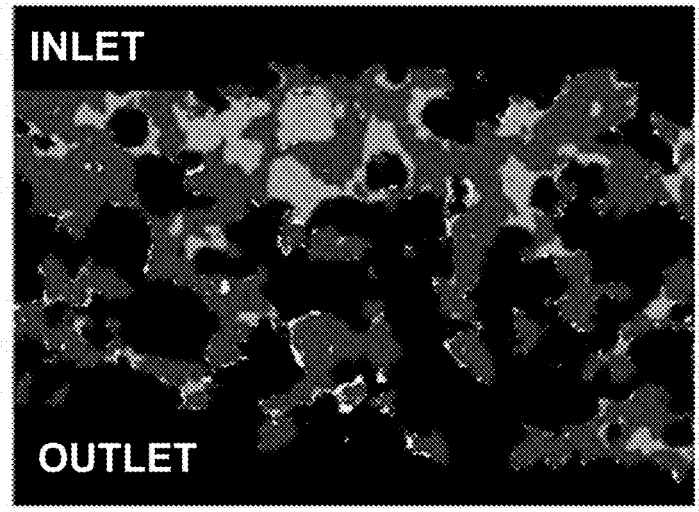
FIG. 18 is an EPMA image of the GPF according to Example 1.
Figure 19:
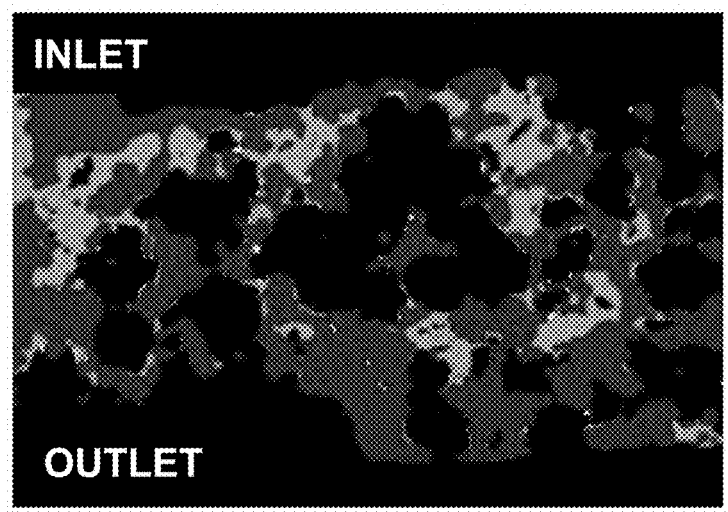
FIG. 19 is an EPMA image of the GPF according to Example 2.
Figure 20:
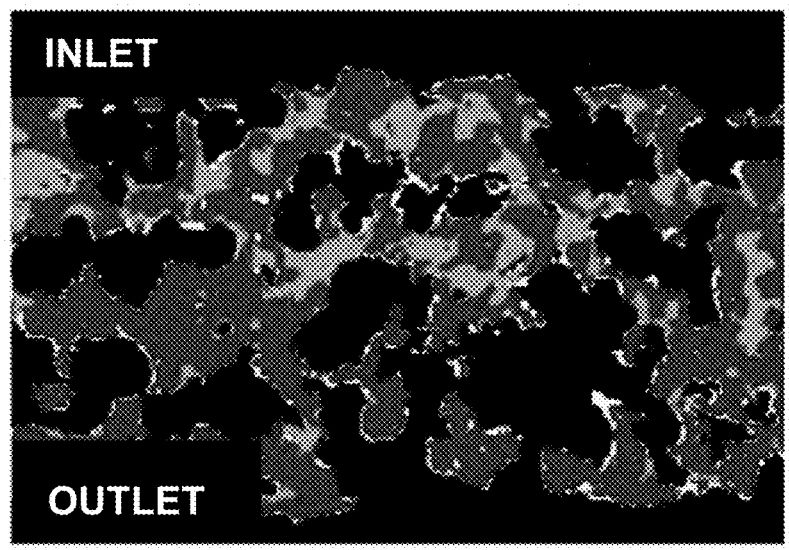
FIG. 20 is an EPMA image of the GPF according to Example 3.
Figure 21:
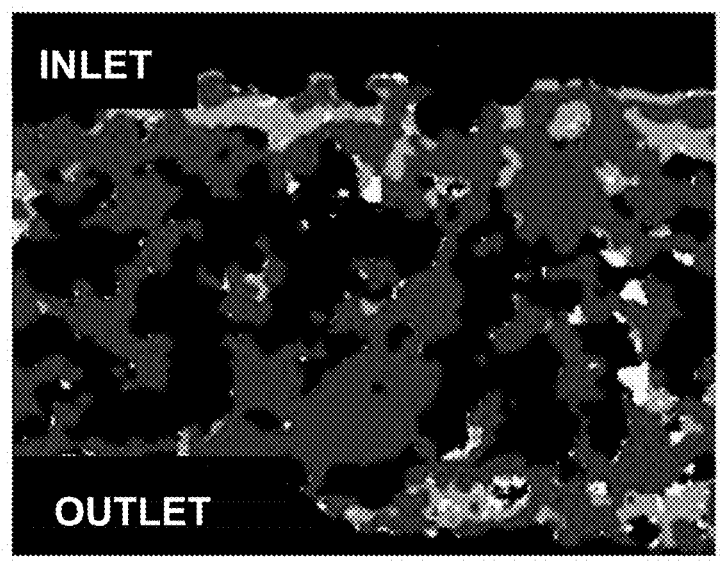
FIG. 21 is an EPMA image of the GPF according to Comparative example 1.
Figure 22:
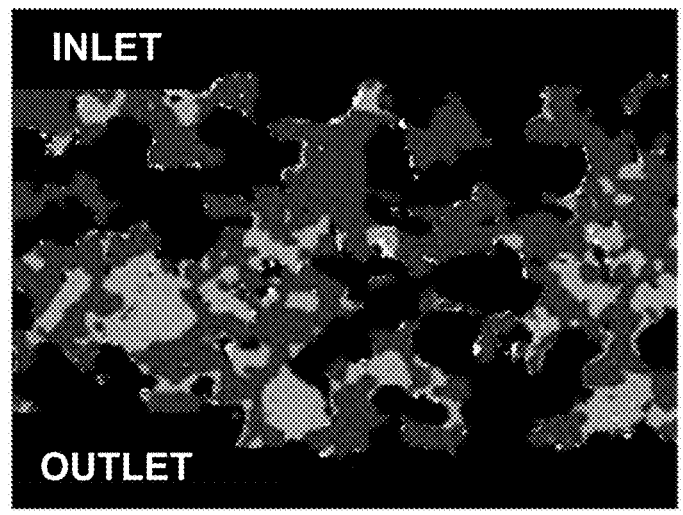
FIG. 22 is an EPMA image of the GPF according to Comparative example 2.

For the GPF of Comparative example 2 in which the particle diameter D90 of the TWC was 3 μm, the inlet/outlet ratio was calculated and it was 0.53. FIG. 17 is a cross-sectional SEM image of the GPF after the durability test (after the deposition of the particulate matters) according to Comparative example 2. As shown in FIG. 17, when the inlet/outlet ratio≥1, it was confirmed that the pores on the inlet side were not narrowed by the TWC and the particulate matters easily entered the pores.

For the GPF of Example 1 in which the particle diameter D90 of the TWC was 0.5 μm, the inlet/outlet ratio was calculated and it was 3.07. Further, for the GPF of Example 2 in which the particle diameter D90 of the TWC was 1 μm, the inlet/outlet ratio was calculated and it was 1.38. In both cases, it was confirmed that the inlet/outlet ratio≥1.

FIGS. 18 to 22 are EPMA images of the respective GPFs according to Examples 1 to 3 and Comparative examples 1 and 2. In FIGS. 18 to 22, a whitest portion represents the TWC, a blackest portion represents the pores, and a gray portion represents the filter substrate. As is clear from these drawings, it was confirmed that the TWC was sufficiently carried on the inner surfaces of the pores of the filter substrate, except for Comparative example 1 shown in FIG. 21. Further, it was confirmed that the pores on the inlet side were narrowed by the TWC, except for Comparative example 2 shown in FIG. 22.

Figure 23:
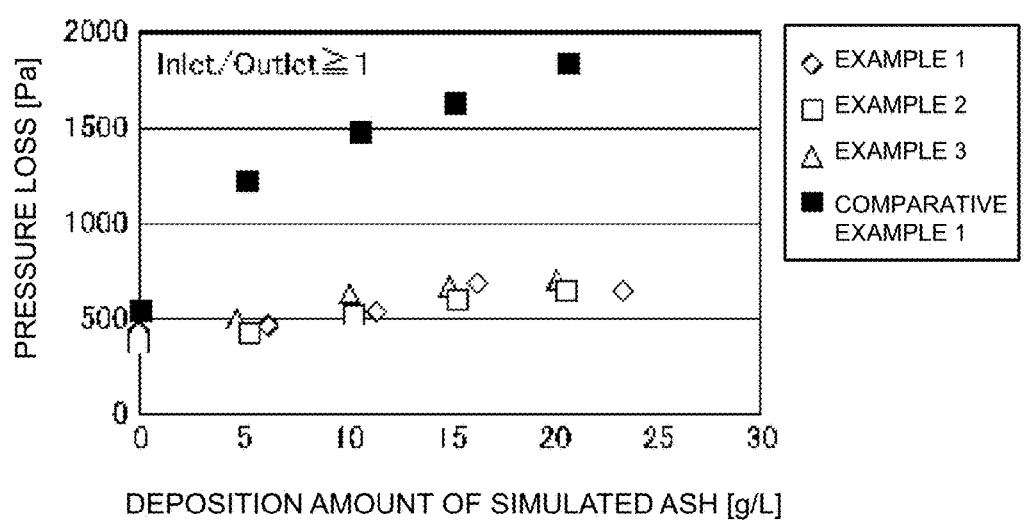
FIG. 23 is a diagram showing a relationship between the deposition amount of simulated ashes and the pressure loss in the GPFs according to Examples 1 to 3 and Comparative example 1.

FIG. 23 is a diagram showing a relationship between the deposition amount of the simulated ashes and the pressure loss in the GPF according to each of Examples and Comparative examples. In FIG. 23, a horizontal axis represents a deposition amount (g/L) of the simulated ash, and a vertical axis represents the pressure loss (Pa). FIG. 23 shows the relationship between the deposition amount of the simulated ashes and the pressure loss in the GPFs according to Examples 1 to 3 and Comparative example 1 in which the inlet/outlet ratio≥1. As shown in FIG. 23, in the GPFs of Examples 1 to 3 in which the particle diameter D90 of the TWC is 3 μm or less, it was confirmed that the pressure loss at the initial stage of the deposition of the simulated ashes hardly increased. On the other hand, in the GPF of Comparative example 1 in which the particle diameter D90 of the TWC was 8 μm, it was confirmed that the pressure loss at the initial stage of the deposition of the simulated ashes increased.

Figure 24:
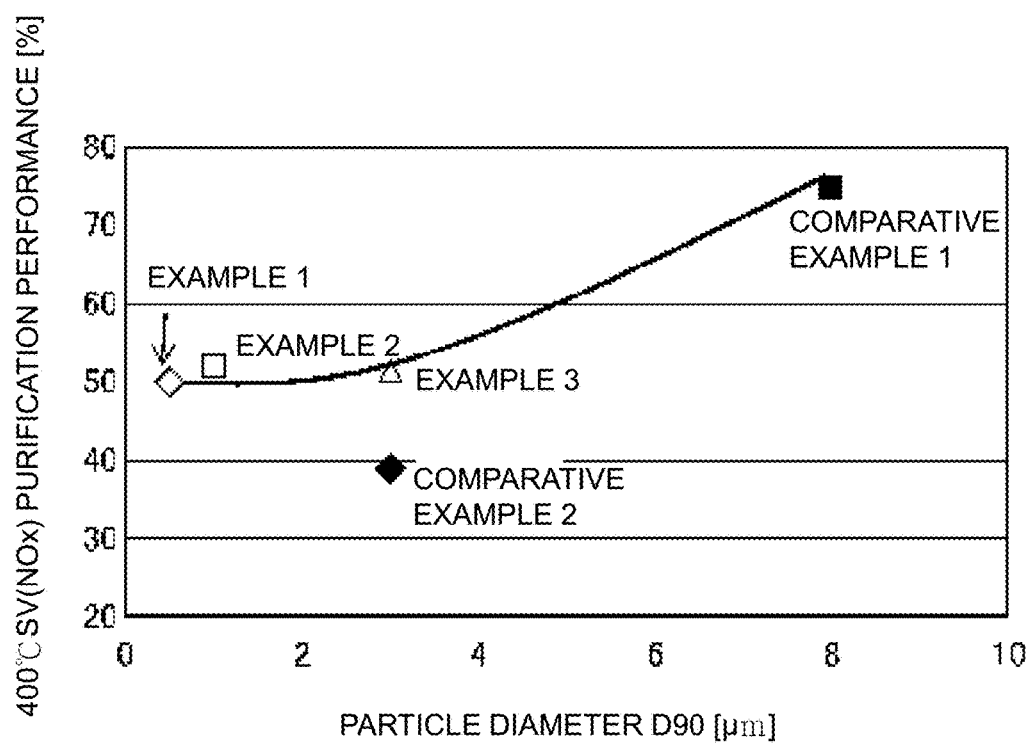
FIG. 24 is a diagram showing a relationship between a particle diameter D90 and catalyst purification performance (NOx purification performance) in the GPFs according to Examples 1 to e and Comparative examples 1 and 2.

FIG. 24 is a diagram showing a relationship between the particle diameter D90 and the catalyst purification performance (NOx purification performance) in the GPF according to each of Examples 1 to 3 and Comparative examples 1 and 2. In FIG. 24, a horizontal axis represents the particle diameter D90 (μm), and a vertical axis represents the NOx purification performance (%). The NOx purification performance (%) was evaluated by cutting out a test piece after thermal duration (after aged) in a high-temperature lean-rich atmosphere to Φ1 inch by a unit evaluation device. In the evaluation device, a gas having a gas composition simulating the exhaust gas was used, and a steady temperature was 400° C., and SV=250,000/hour.

As shown in FIG. 24, it is better for the catalyst purification performance to have a larger particle diameter D90 of the TWC, but in consideration of the pressure loss, the D90 is preferably smaller, and when the inlet/outlet ratio≥1 even for the same small particle diameter, it was found that the contact performance between the TWC and the exhaust gas was improved and the purification performance was improved as is apparent from comparison between Examples 1 to 3 and Comparative example 2. It was confirmed that both the catalyst purification performance and the pressure loss were satisfied when the inlet/outlet ratio≥1 and the particle diameter D90 of the TWC is 0.5 to 3 μm.

Figure 25:
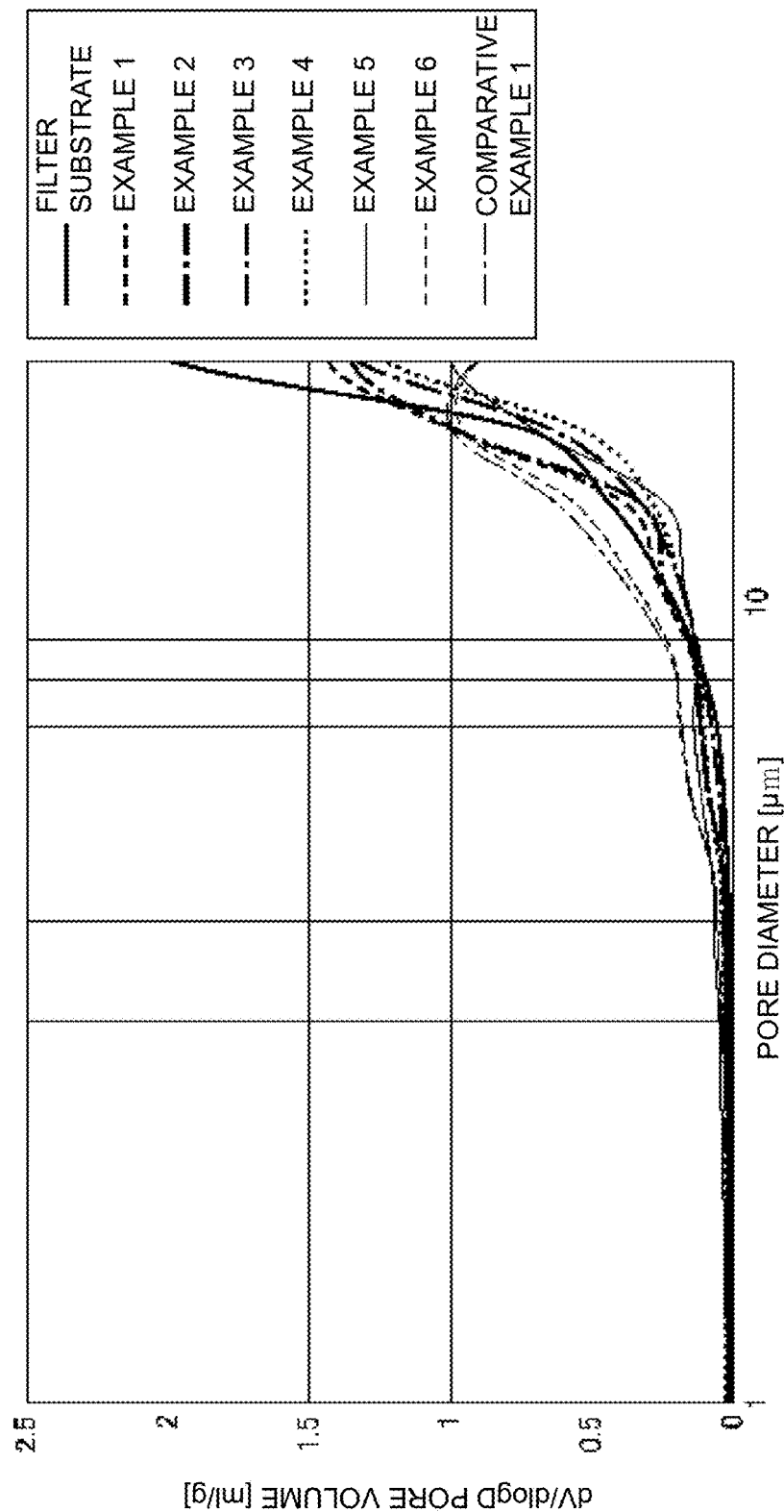
FIG. 25 is a diagram showing the pore distribution in the GPFs according to Examples 1 to 6 and Comparative example 1.

FIG. 25 is a diagram showing the pore distribution in the GPFs according to Examples 1 to 6 and Comparative example 1. More specifically, FIG. 25 is a partially enlarged view enlarging a range in which the pore diameter is 10.7 μm or less in FIG. 5 described above. In FIG. 25, a horizontal axis represents the pore diameter (μm), and a vertical axis represents the Log differential pore volume distribution dV/d(log D)(ml/g).

As described above, the pores in the second region in which the pore diameter is 0.1 μm to 10.7 μm are configured with the pores formed between the catalyst particles and some (small pores) of the pores of the filter substrate forming the partition wall. As shown in FIG. 25, in the second region, it was confirmed that the pore volume (ml/g) was changed and the pores were formed between the catalyst particles as compared with the filter substrate in each of Examples.

Figure 26:
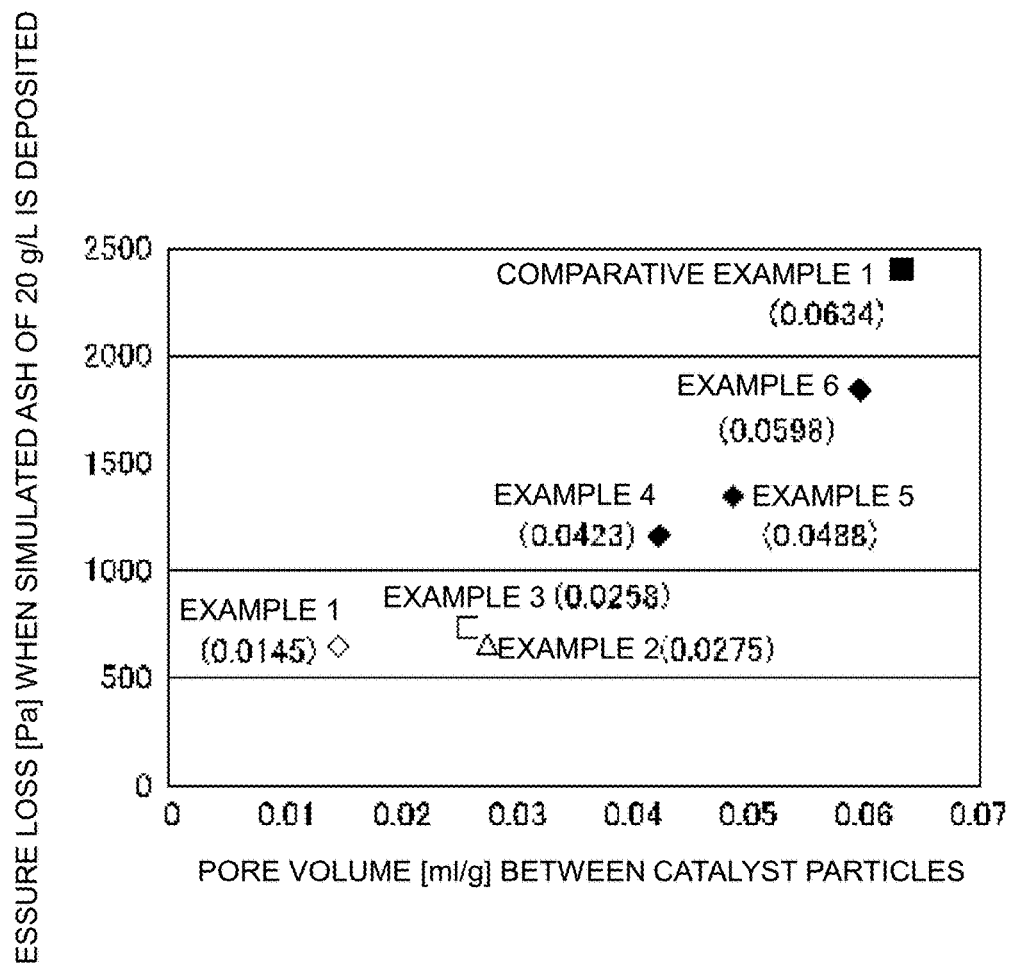
FIG. 26 is a diagram showing a relationship between a pore volume between catalyst particles and the pressure loss at the initial stage of the deposition in the GPFs according to Examples 1 to 3 and Comparative example 1.

FIG. 26 is a diagram showing a relationship between the pore volume between the catalyst particles and the pressure loss at the initial stage of the deposition in the GPFs according to Examples 1 to 3 and Comparative example 1. In FIG. 26, a horizontal axis represents the pore volume (ml/g) between the catalyst particles, and a vertical axis represents the pressure loss (Pa) at the time of depositing the simulated ashes of 20 g/L. Further, in FIG. 26, numerical values in parentheses represent a difference between a total volume of the pores having the pore diameters within the range of 0.1 μm to 10.7 μm in the pore distribution of the GPF and a total volume of the pores having the pore diameters within the range of 0.1 μm to 10.7 μm in the pore distribution of the filter substrate, that is, the pore volume (mL/g) between the catalyst particles.

Here, it is understood that, when the pressure loss at the time of deposition of the ashes of 20 g/L exceeds 2,000 Pa, the output is adversely affected. Therefore, from result of FIG. 26, when the difference between the total volume of the pores having the pore diameters within the range of 0.1 μm to 10.7 μm in the pore distribution of the GPF and the total volume of the pores having the pore diameters within the range of 0.1 μm to 10.7 μm in the pore distribution of the filter substrate, that is, the pore volume (mL/g) between the catalyst particles is 0.015 ml/g~0.06 ml/g, it was confirmed that the pressure loss could be reduced and the high catalyst purification performance and particulate matter capturing performance could be obtained.

What is claimed is:

1. An exhaust purifying filter which is provided in an exhaust passage of an internal combustion engine and captures and purifies particulate matters in an exhaust gas of the internal combustion engine, comprising:
    a filter substrate in which a plurality of cells extending from an inflow-side end surface of the exhaust gas to an outflow-side end surface are partitioned and formed by a porous partition wall and an inflow-side cell in which an opening in the outflow-side end surface is sealed and an outflow-side cell in which an opening in the inflow-side end surface is sealed are alternately disposed, and
    a three-way catalyst which is carried on the partition wall,
    wherein a difference between a total volume of pores having pore diameters within a range of 0.1 μm to 10.7 μm in pore distribution of the exhaust purifying filter and a total volume of pores having pore diameters within a range of 0.1 μm to 10.7 μm in pore distribution of the filter substrate is 0.015 ml/g to 0.06 ml/g.

2. The exhaust purifying filter according to claim 1, wherein a content rate of the three-way catalyst in the partition wall is higher on an inflow-side cell side than on an outflow-side cell side in a thickness direction of the partition wall.

3. The exhaust purifying filter according to claim 2, wherein the filter substrate has a pore diameter of more than 5 μm, and
    the three-way catalyst has a particle diameter D90 of 5 μm or less when cumulative distribution from a small particle diameter side in particle diameter distribution becomes 90%.

4. The exhaust purifying filter according to claim 3, wherein the filter substrate has the pore diameter of more than 5 μm, and
    the three-way catalyst has a particle diameter D90 of 0.5 μm to 3 μm when the cumulative distribution from the small particle diameter side in the particle diameter distribution becomes 90%.

5. The exhaust purifying filter according to claim 1, wherein the filter substrate has a pore diameter of more than 5 μm, and
    the three-way catalyst has a particle diameter D90 of 5 μm or less when cumulative distribution from a small particle diameter side in particle diameter distribution becomes 90%.

6. The exhaust purifying filter according to claim 5, wherein the filter substrate has the pore diameter of more than 5 μm, and
    the three-way catalyst has a particle diameter D90 of 0.5 μm to 3 μm when the cumulative distribution from the small particle diameter side in the particle diameter distribution becomes 90%.

* * * * *